US012590877B2

(12) United States Patent
Naschitz

(10) Patent No.: US 12,590,877 B2
(45) Date of Patent: Mar. 31, 2026

(54) MEASURING DEFORMATION THRESHOLD OF PRODUCE

(71) Applicant: MIGAL GALILEE RESEARCH INSTITUTE LTD., Kiryat Shmona (IL)

(72) Inventor: Shaul Naschitz, Kibbutz El-Rom (IL)

(73) Assignee: MIGAL GALILEE RESEARCH INSTITUTE LTD., Kiryat Shmona (IL)

( * ) Notice: Subject to any disclaimer, the term of this patent is extended or adjusted under 35 U.S.C. 154(b) by 153 days.

(21) Appl. No.: 17/623,866

(22) PCT Filed: Jul. 1, 2020

(86) PCT No.: PCT/IL2020/050731
§ 371 (c)(1),
(2) Date: Dec. 29, 2021

(87) PCT Pub. No.: WO2021/001824
PCT Pub. Date: Jan. 7, 2021

(65) Prior Publication Data
US 2022/0364968 A1 Nov. 17, 2022

Related U.S. Application Data

(60) Provisional application No. 62/869,102, filed on Jul. 1, 2019.

(51) Int. Cl.
*G01N 3/42* (2006.01)

(52) U.S. Cl.
CPC ....... *G01N 3/42* (2013.01); *G01N 2203/0085* (2013.01)

(58) Field of Classification Search
CPC . G01N 3/42; G01N 2203/0085; G01N 33/025
(Continued)

(56) References Cited

U.S. PATENT DOCUMENTS 4,061,020 A 12/1977 Fridley
5,918,266 A 6/1999 Robinson
(Continued)

FOREIGN PATENT DOCUMENTS

EP 0439405 A1 * 7/1991
FR 2595824 A1 * 9/1987
(Continued)

OTHER PUBLICATIONS

R. Lu et al., A New Bioyield Tester For Measuring Apple Fruit Firmness, 2005, Applied Engineering in Agriculture, 2005 American Society of Agricultural Engineers ISSN 0883-8542, vol. 21(5): 893-900 (Year: 2005).*
(Continued)

*Primary Examiner* — Marrit Eyassu
(74) *Attorney, Agent, or Firm* — The Roy Gross Law Firm, LLC; Roy D. Gross

(57) ABSTRACT

A system comprising a testing device comprising: a probe configured to be advanced to engage a produce item positioned in relation to the testing device, and at least one sensor configured to measure a resisting force by the produce item to the advancing; at least one hardware processor; and a non-transitory computer-readable storage medium having stored thereon program instructions, the program instructions executable by the at least one hardware processor to: operate the testing device to continuously advance the probe to engage a surface of the produce item while measuring the resisting force, discontinue the advancing when the resisting force ceases to increase as a result of the advancing, and determine a highest resisting force measured during the advancing, wherein the highest resisting force is indicative of a firmness value of the produce item.

14 Claims, 23 Drawing Sheets

(58) Field of Classification Search
    USPC ...................................................... 73/78–85
    See application file for complete search history.

(56)                     References Cited

U.S. PATENT DOCUMENTS

| | | | |
|---|---|---|---|
| 6,240,766 B1 * | 6/2001 | Cawley ................ | G01N 33/025 |
| | | | 73/12.01 |
| 6,643,599 B1 * | 11/2003 | Mohr ........................ | G01N 3/42 |
| | | | 702/41 |
| 9,442,055 B2 * | 9/2016 | Benedetti ................. | G01N 3/30 |
| 9,500,633 B2 * | 11/2016 | Mohr ........................ | G01N 3/00 |
| 2013/0333454 A1 * | 12/2013 | Benedetti ................. | G01N 3/30 |
| | | | 73/81 |
| 2018/0042178 A1 * | 2/2018 | Nakano ................ | G01N 21/359 |

FOREIGN PATENT DOCUMENTS

| | | | | |
|---|---|---|---|---|
| IL | 100578 A | 5/1995 | | |
| JP | H01195338 A | 8/1989 | | |
| JP | 2012008075 A | 1/2012 | | |
| WO | WO-9840737 A1 * | 9/1998 | .............. | G01N 3/48 |
| WO | 2012146841 A1 | 11/2012 | | |
| WO | 2017058015 A1 | 4/2017 | | |

OTHER PUBLICATIONS

Garcia-Ramos, Francisco & Valero, Constantino & Homer, Ian & Puig-Mauri, Jaime & Ruiz-Altisent, Margarita. (2005). Non destructive fruit firmness sensors A review. Span. J. Agric. Res .. 3(1): 61-73 10.5424/sjar/2005031-125.

Kubik, L'ubomir & Kažimírová, Viera. (2015). Determination of Mechanical Properties of Apple Cultivar Golden Delicious. Journal on Processing and Energy in Agriculture. 19. 1821-4487.

Li, Z., Miao, F. and Andrews, J. (2017), Mechanical Models of Compression and Impact on Fresh Fruits. Comprehensive Reviews in Food Science and Food Safety, 16: 1296-1312. https://doi.org/10.1111/1541-4337.12296.

Lu, Renfu & Srivastava, Ajit K & Beaudry, Randolph. (2005). A new bioyield tester for measuring apple fruit firmness. Applied Engineering in Agriculture. 21. 10.13031/2013.19693.

Stentor—The 1 to 5KN test machine—Andilog Technologies. (2007). Andilog. Retrieved Oct. 2, 2022, from https://web.archive.org/web/20070622012609/http://www.andilog.com/ang/produit-The-1-to-5KN-test-machine-AND+STR.html.

International Search Report of PCT/IL2020/050731 Completed Sep. 8, 2020; Mailed Sep. 9, 2020 2 pages.

Written Opinion of PCT/IL2020/050731 Completed Sep. 8, 2020; Mailed Sep. 9, 2020 6 pages.

Imanpanah, H., Kasraei, M., Raoufat, M. H., & Nejadi, J. (2015). Development and Evaluation of a Portable Apparatus for Bioyield Detection: A Case Study with Apple and Peach Fruits. International Journal of Food Properties, 18(7), 1434-1445. doi:10.1080/10942912.2013.767830.

R. Lu, & N. C. Tipper. (2009). A Portable Device for the Bioyield Detection to Measure Apple Firmness. Applied Engineering in Agriculture, 25(4), 517-523. doi:10. 13031/2013.27455.

Sadao Omori et al: "Research and Development of Nondestructive Quality Evaluation Technologies based on Physical Properties of Fruit and Vegetables", Technical Report of the Institute of Agricultural Machinery, Institute of Agricultural Machinery, JP, No. 40, Feb. 1, 2011 (Feb. 1, 2011), pp. 1-65, XP009544066, ISSN: 1341-0148.

Imanpanah, H., Kasraei, M., Raoufat, M.H. and Nejadi, J., 2015. Development and evaluation of a portable apparatus for bioyield detection: A case study with apple and peach fruits. International Journal of Food Properties, 18(7), pp. 1434-1445.

Kubik, L'. and Kažimírová, V., 2015. Determination of Mechanical Properties of Apple Cultivar Golden Delicious Odredivanje Mehaničkih Osobina Sorte Jabuke Zlatni Delišes. Journal on processing and energy in agriculture, 19(1), p. 17.

Lu, R., Srivastava, A.K. and Beaudry, R.M., 2005. A new bioyield tester for measuring apple fruit firmness. Applied Engineering in Agriculture, 21(5), pp. 893-900.

Lu, R. and Tipper, N.C., 2009. A portable device for the bioyield detection to measure apple firmness. Applied Engineering in Agriculture, 25(4), pp. 517-523.

Sadao Omori et al., "Research and Development of Nondestructive Quality Evaluation Technologies based on Physical Properties of Fruit and Vegetables", Technical Report of the Institute of Agricultural Machinery, Institute of Agricultural Machinery, JP, (Feb. 1, 2011), No. 40, ISSN 1341-0148, pp. 1-65, XP009544066.

The 1 to 5KN test machine—Stentor—Andilog Technologies Author:Andilog Technologies. Publication data WebArchive, Jun. 22, 2007 Andilog Technologies. URL:https://web.archive.org/web/20070622012609/http://www.andilog.com/ang/produit-The-1-to-5KN-test-machineAND+STR.html.

* cited by examiner

220
ADVANCE PROBE TO ENGAGE A SURFACE OF PRODUCE UNDER TESTING

222
CONTINUOUSLY ADVANCE THE PROBE INTO THE PRODUCE IN SPECIFIED DISTANCE INCREMENTS

224
CONTINUOUSLY MEASURE A RESISTANCE FORCE TO THE PROBE

226
DETERMINE A POINT WHEN A CHANGE IN RESISTANCE FORCE BETWEEN INCREMENTS DECREASES

228
STOP THE ADVANCE OF THE PROBE

230
AND REGISTERING A TOTAL DISTANCE TO THAT POINT

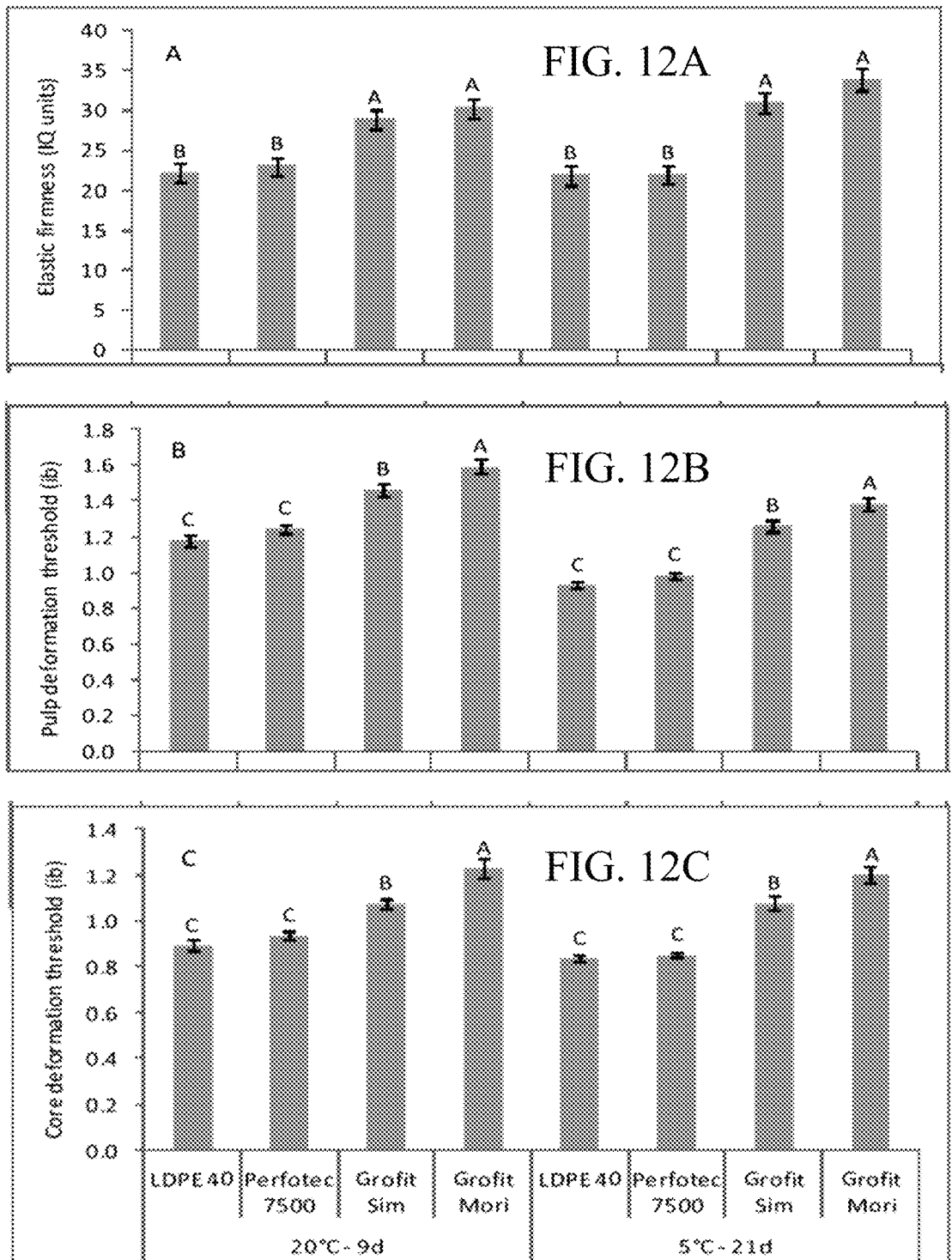

MEASURING DEFORMATION THRESHOLD OF PRODUCE

CROSS REFERENCE TO RELATED APPLICATIONS

This application is a National Phase application of PCT Patent Application No. PCT/IL2020/050731 having International filing date of Jul. 1, 2020, which claims priority from U.S. Provisional Patent Application No. 62/869,102, filed on Jul. 1, 2019, entitled "METHODS FOR MEASURING DEFORMATION THRESHOLD OF AGRICULTURAL PRODUCES," the contents of which are all incorporated herein by reference in their entirety.

FIELD OF THE INVENTION

The present invention relates to methods for accurately measuring the firmness of various agricultural produces in order to evaluate their ripeness, without damaging the agricultural produces.

BACKGROUND

Instrumented fruit firmness assessment has been used by growers and the storage industry as a ripeness index for many decades. However, it has not been widely used at the retail level-mainly due to complexity of measurement, costly machinery, and required skill for measuring.

Known methods for measuring produce texture include destructive testing, such as penetrometer, which destroy the tested produce and prevent further use thereof, and non-destructive testing, such as acoustic measurements, elastic impact assessment and elastic micro-deformation, which do not harm the tested produce. Other methods for evaluating fruit firmness, such as optical and nuclear magnetic resonance (NMR), have not gained wide acceptance (García-Ramos F. J. et al., Spanish Journal of Agricultural Research, 2005 Vol. 3(1): 61-73) due to their complexity and cost.

However, known methods and devices for measuring agricultural produce firmness have many drawbacks, such as: destructiveness, cumbersome and expensive machinery, long testing procedures which only allow testing a small sample, fruit specificity, inaccuracy, etc.

Accordingly, there is a need for a non-destructive test method with a wide coverage of agricultural produce that is easy to operate for evaluation of the time period required for a fruit or vegetable to reach satisfactory quality for consumption as well as evaluation of storage potential and harvest scheduling.

SUMMARY

The following embodiments and aspects thereof are described and illustrated in conjunction with systems, tools and methods which are meant to be exemplary and illustrative, not limiting in scope.

There is provided, in an embodiment, a system comprising a testing device comprising: a probe configured to be advanced to engage a produce item positioned in relation to the testing device; at least one sensor configured to measure a resisting force by the produce item to the advancing; at least one hardware processor; and a non-transitory computer-readable storage medium having stored thereon program instructions, the program instructions executable by the at least one hardware processor to: operate the testing device to continuously advance the probe to engage a surface of the produce item while measuring the resisting force, discontinue the advancing when the resisting force ceases to increase as a result of the advancing, and determine a highest resisting force measured during the advancing, wherein the highest resisting force is indicative of a firmness value of the produce item.

There is also provided, in an embodiment, a method for measuring firmness of a produce item, the method comprising: providing a testing device comprising a probe configured to be advanced to engage a produce item positioned in relation to the testing device, and at least one sensor configured to measure a resisting force by the produce item to the advancing; operating the testing device to continuously advance the probe to engage a surface of the produce item while measuring the resisting force; discontinuing the advancing when the resisting force ceases to increase as a result of the advancing; and determining a highest resisting force measured during the advancing, wherein the highest resisting force is indicative of a firmness value of the produce item.

In some embodiments, the produce item is one of a fruit and a vegetable.

In some embodiments, the firmness value is indicative of a ripeness parameter of the produce item.

In some embodiments, the operating, discontinuing, and determining are iterated, with respect to a produce item of a specified variety, at two or more known ripeness stages of the produce item. In some embodiments, the highest resisting values associated with each of the iterations are stored as firmness values indicative of a ripeness parameter of the specified variety at the two or more ripeness stages.

In some embodiments, the advancing is performed in increments of a specified distance. In some embodiments, the specified distance is between 0.001 and 0.1 mm.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

Figure 4:
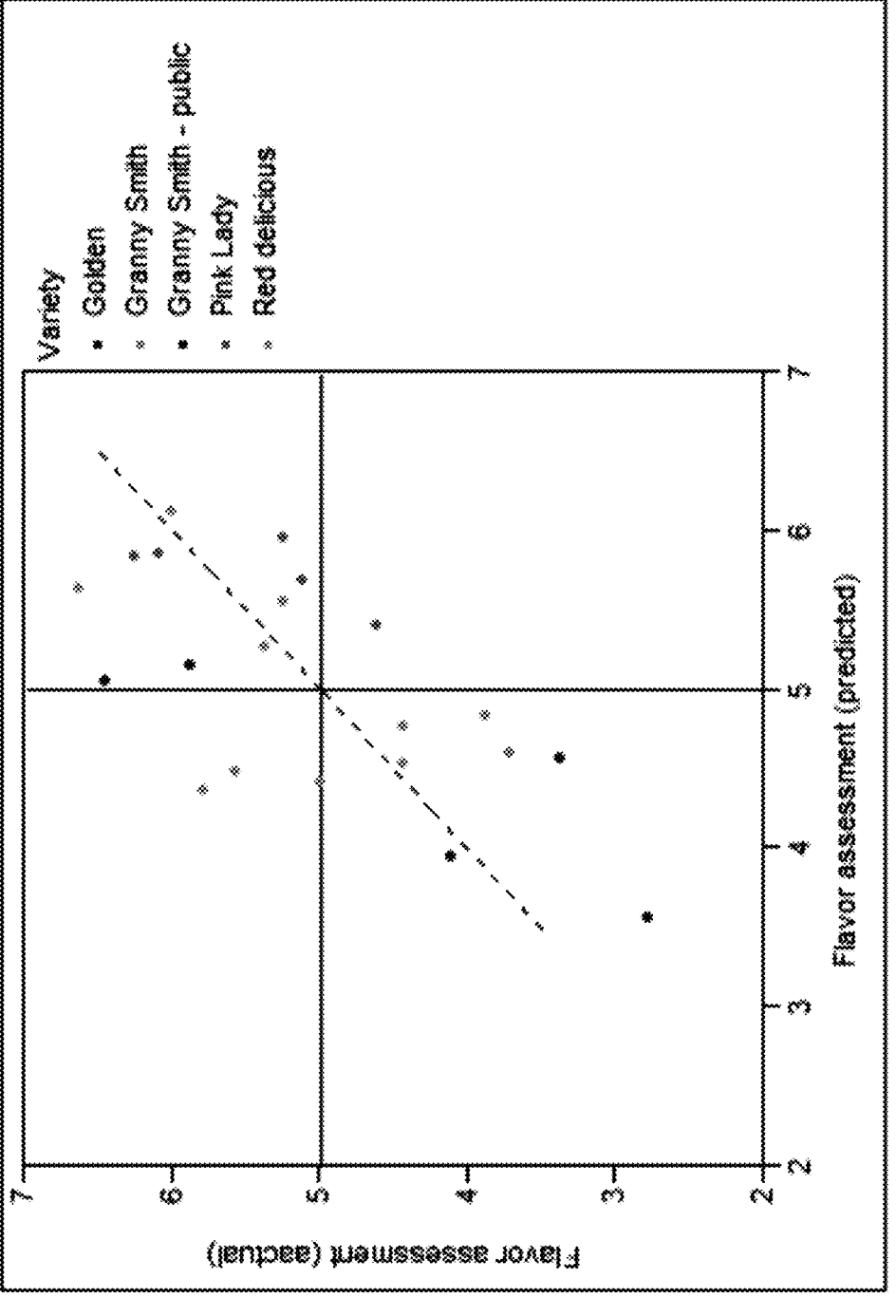
Figure 5:
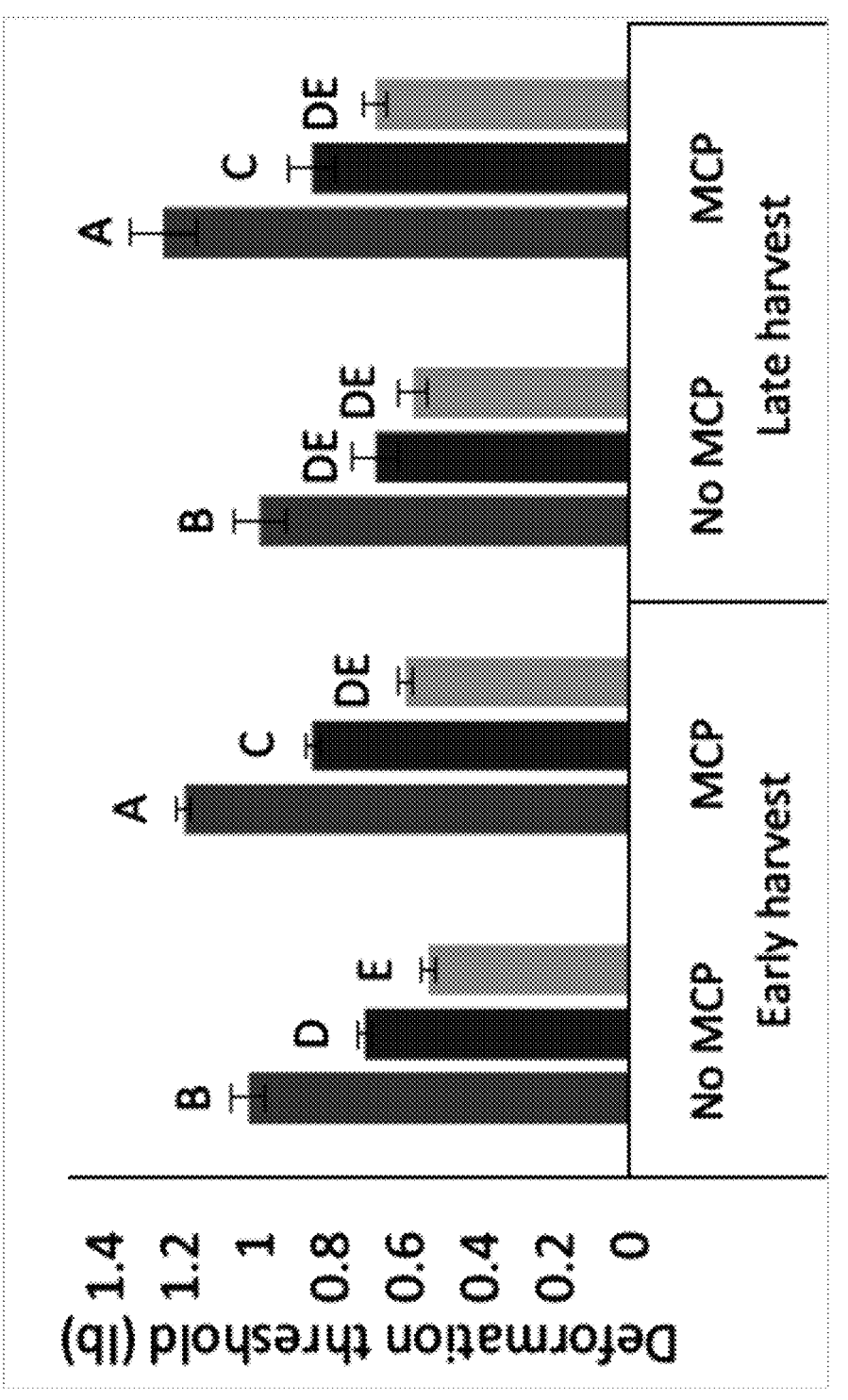

2B is a flowchart of the functional steps in a method for measuring agricultural produce firmness and ripeness, according to some embodiments of the present disclosure;

FIGS. 3A-3D show changes in penetrometric firmness (3A-3B) and in deformation threshold (3C-3D) of Granny Smith apples harvested on various dates;

FIG. 4 shows the performance of a linear model predicting the perceived "total flavor satisfaction" from TSS and deformation threshold for different apple varieties;

FIG. 5 shows deformation threshold of 'Heyward' kiwifruits harvested on two dates and subsequently treated or not treated with 1-MCP;

US 12,590,877 B2

3

Figure 6:
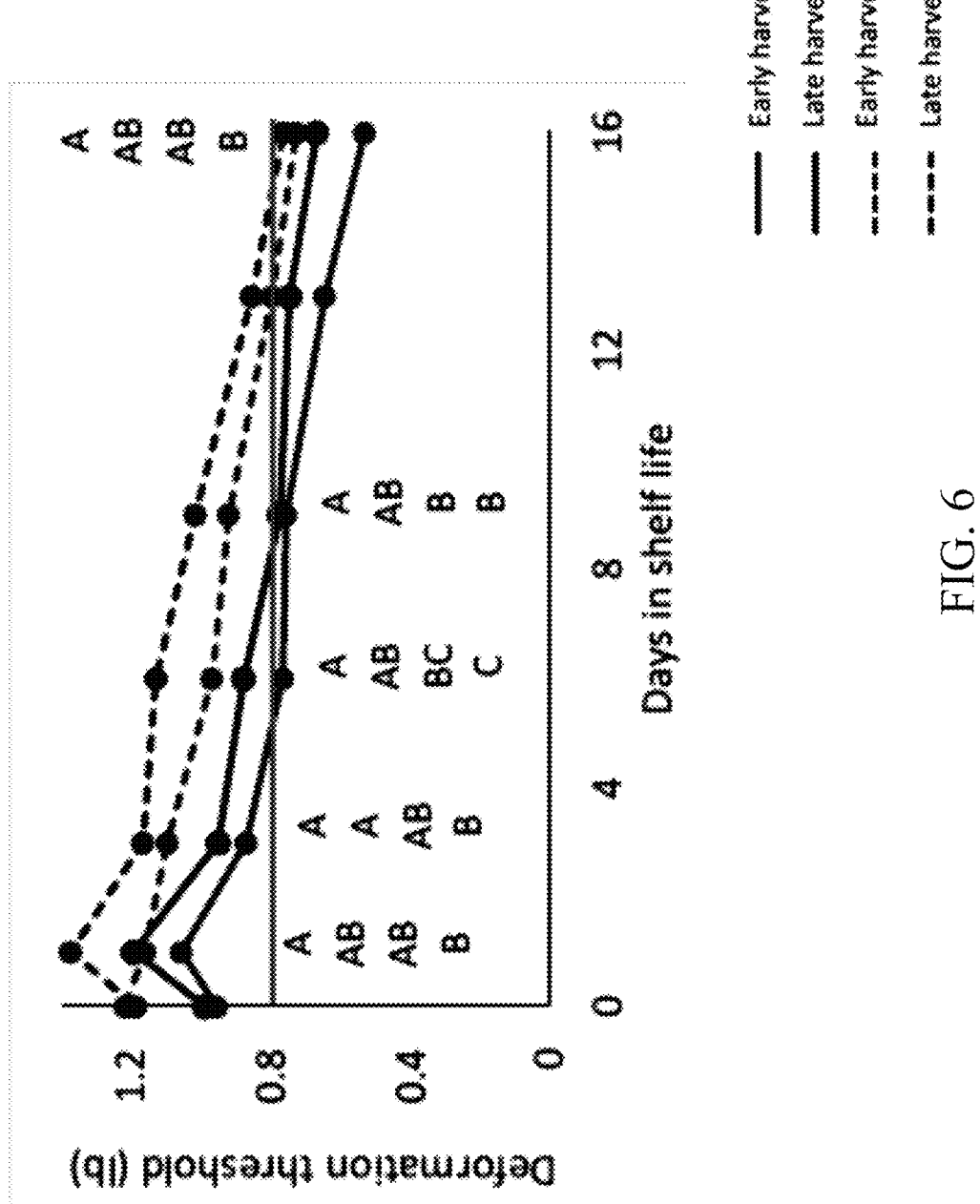
Figure 7:
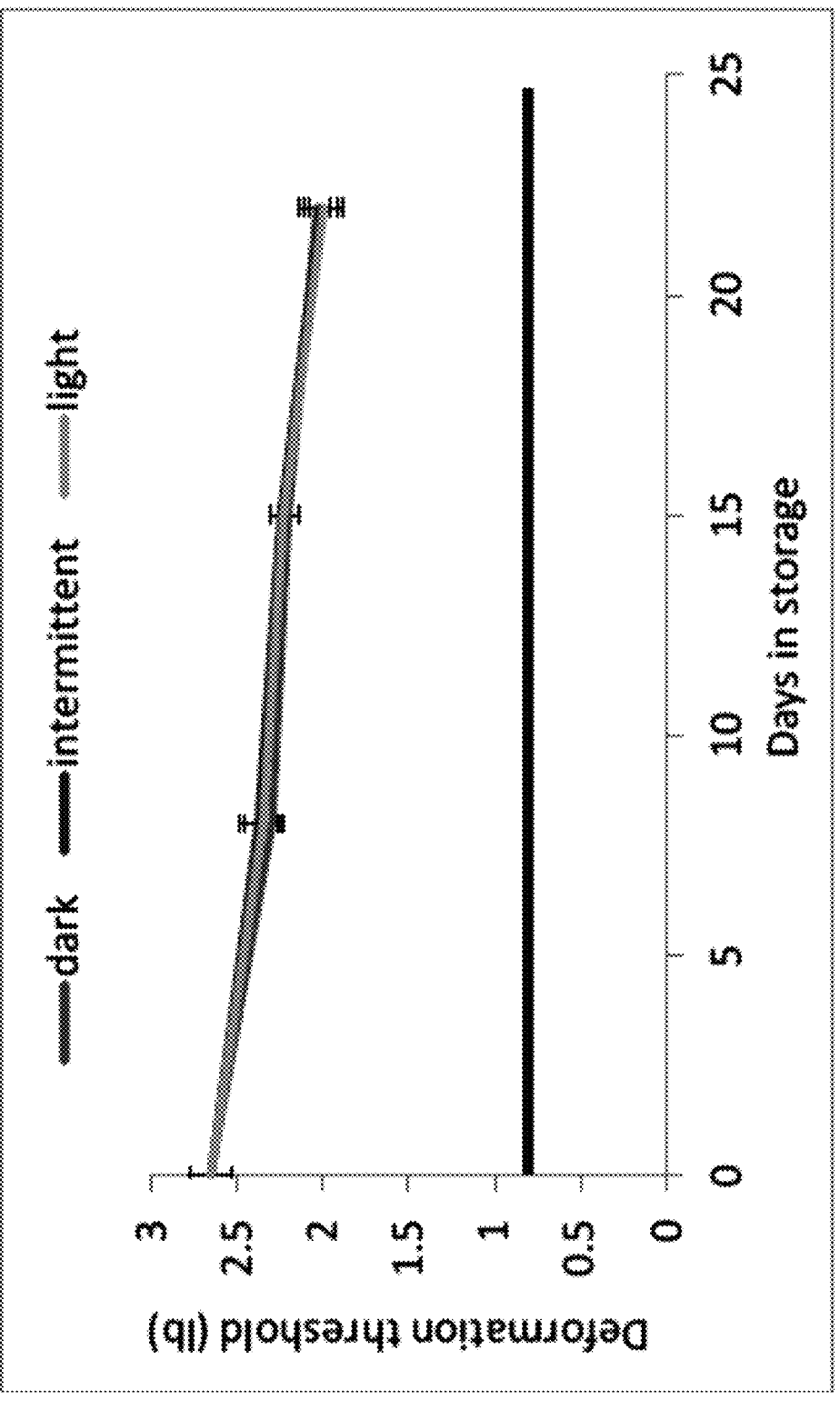
Figure 8A:
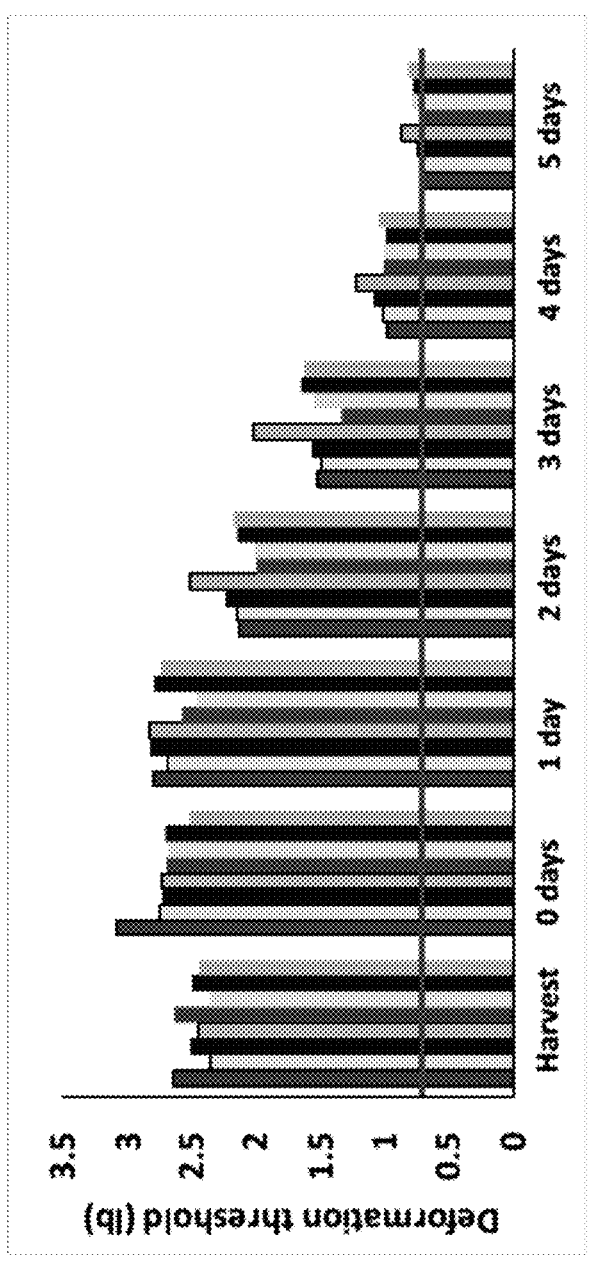
Figure 8B:
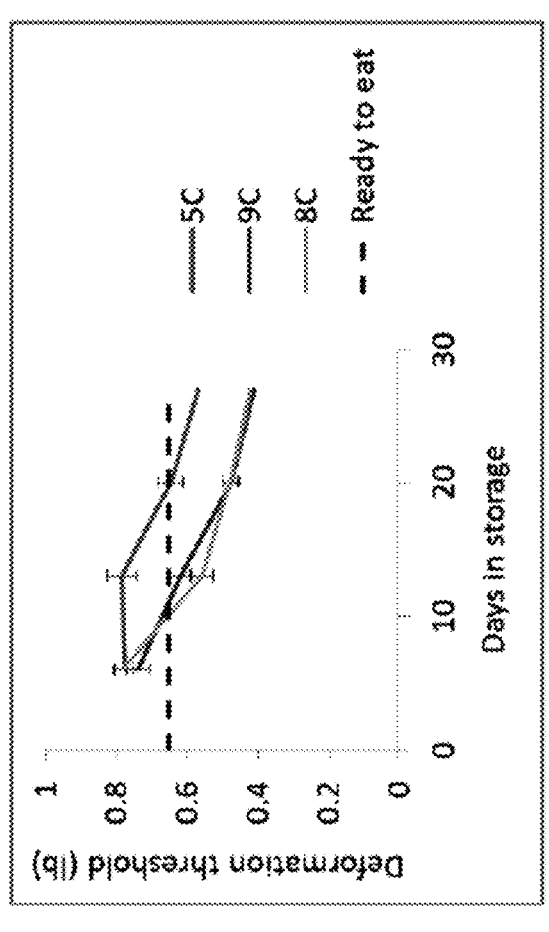
Figure 9:
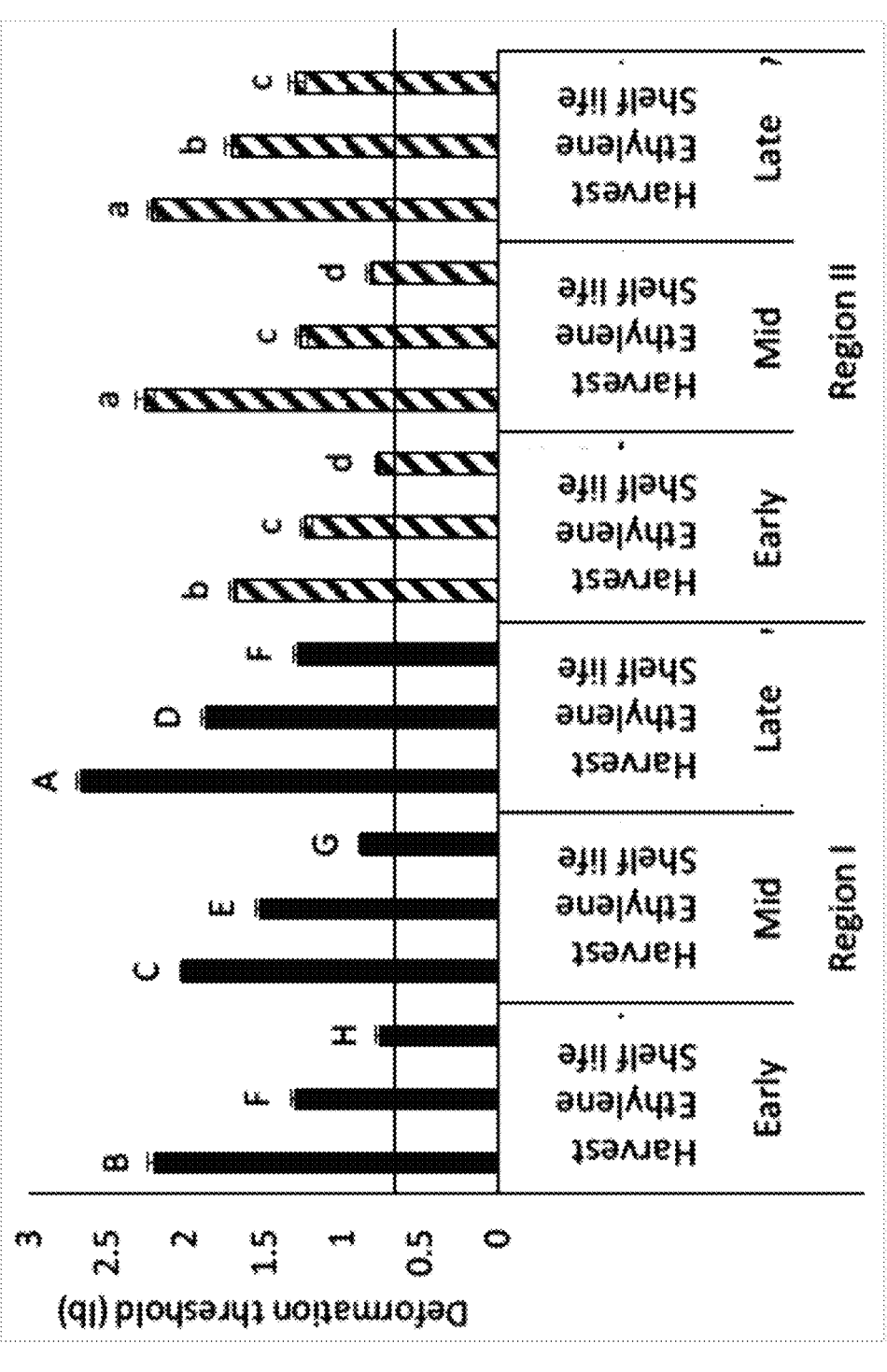
Figure 10A:
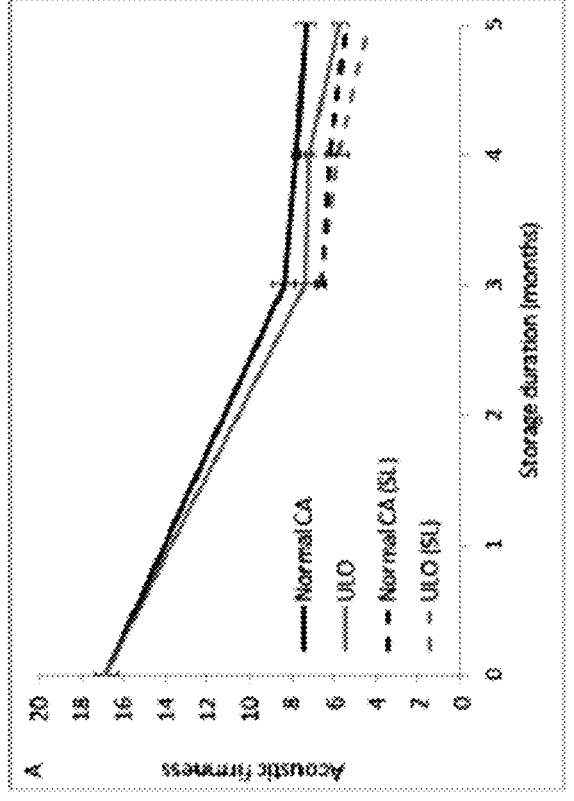
Figure 10B:
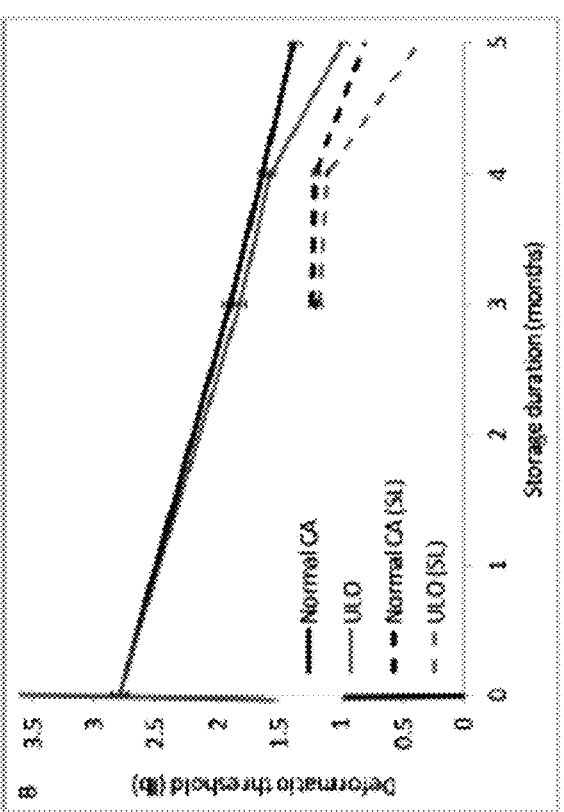
Figure 11:
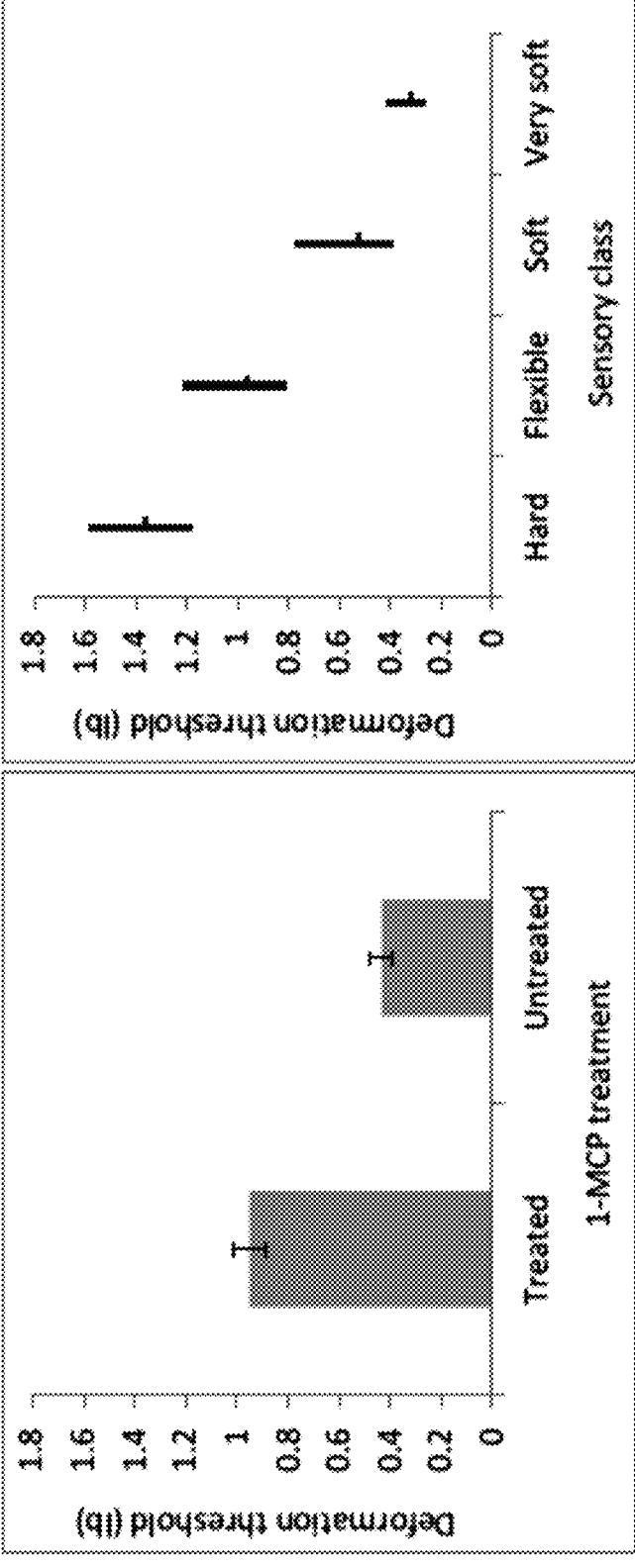
Figure 13A:
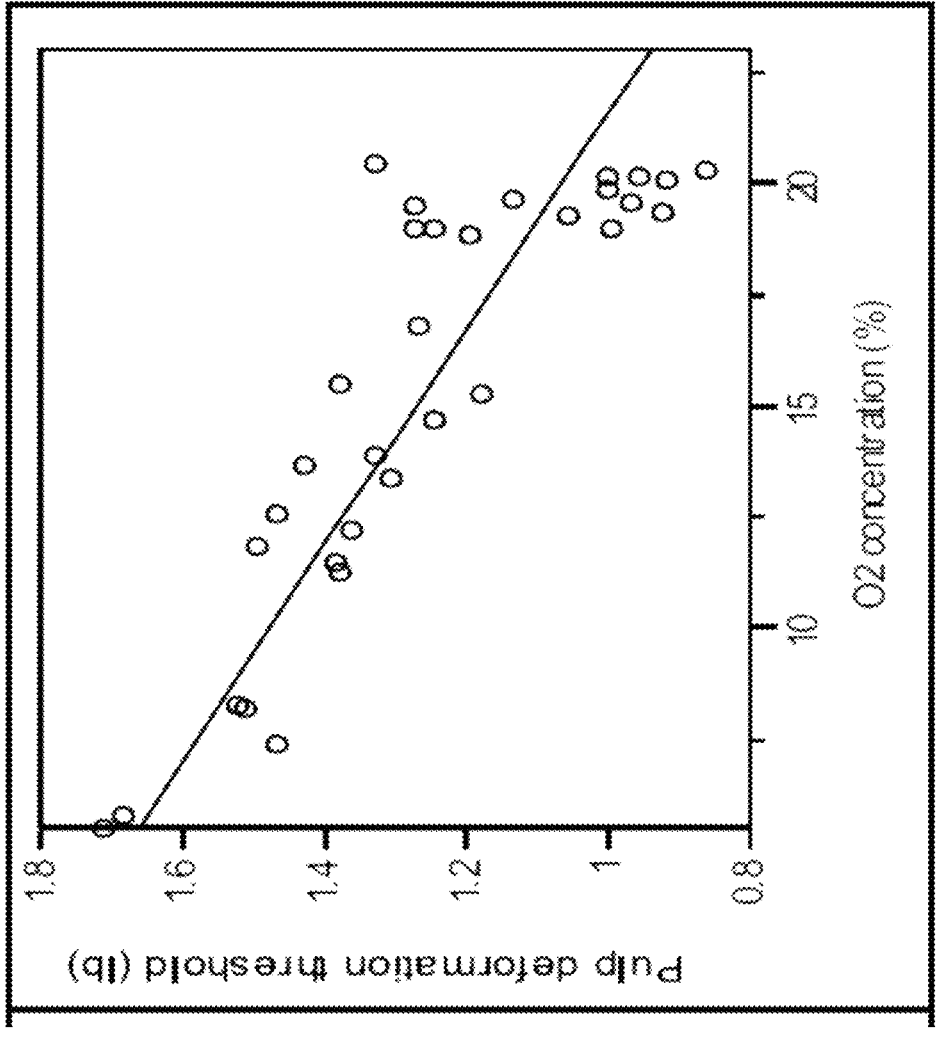
Figure 13B:
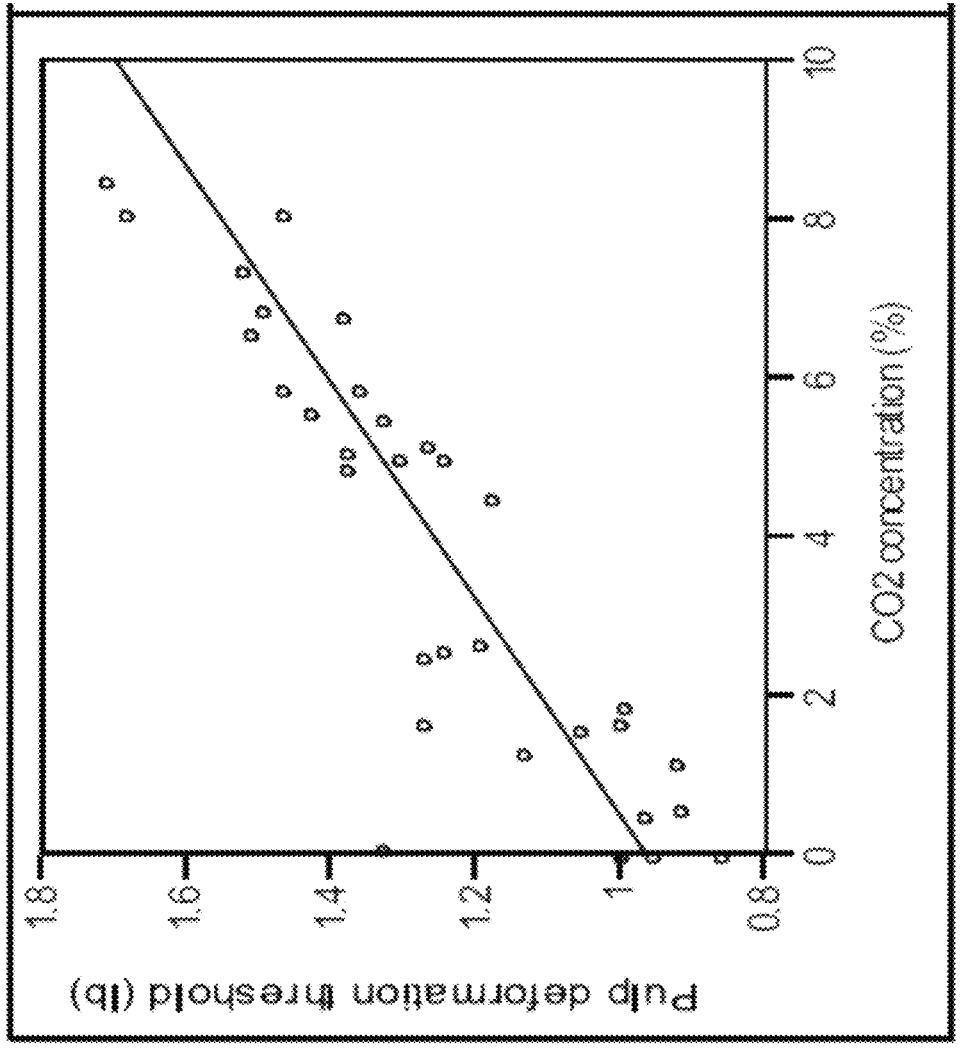
Figure 14A:
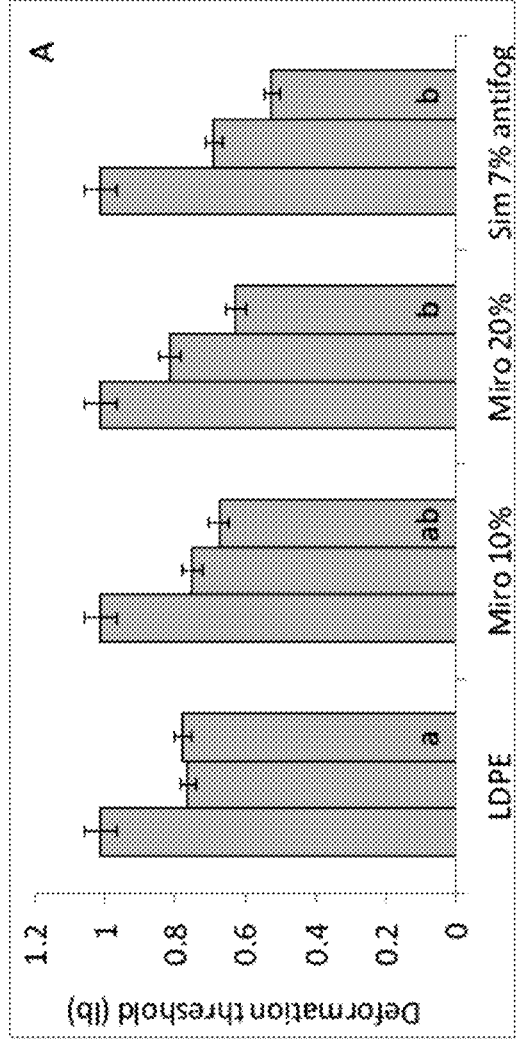
Figure 14B:
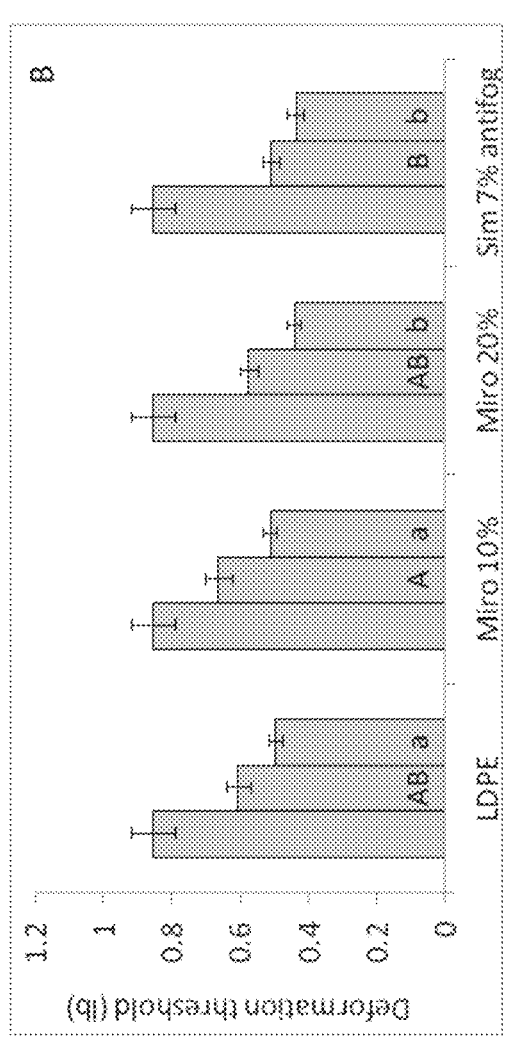
Figure 15:
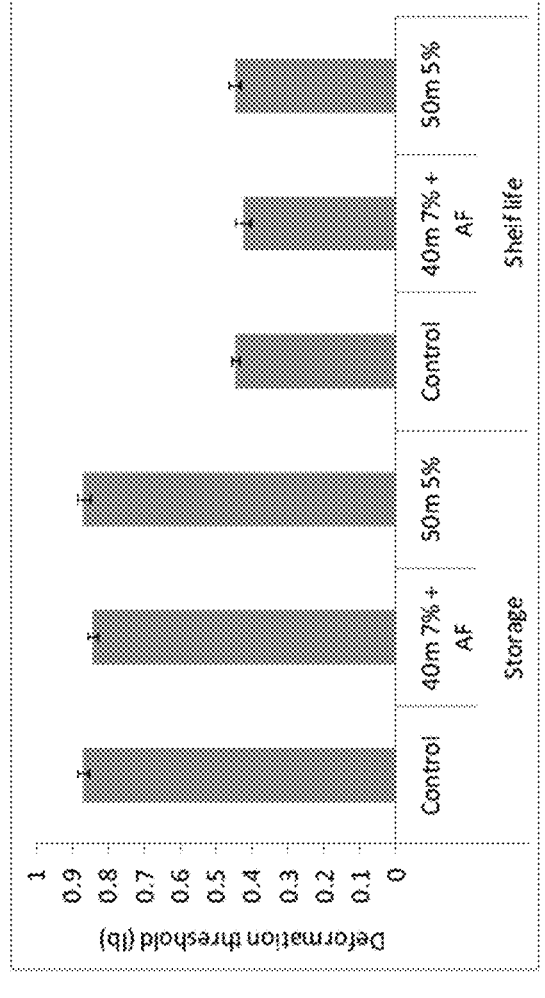
Figure 16:
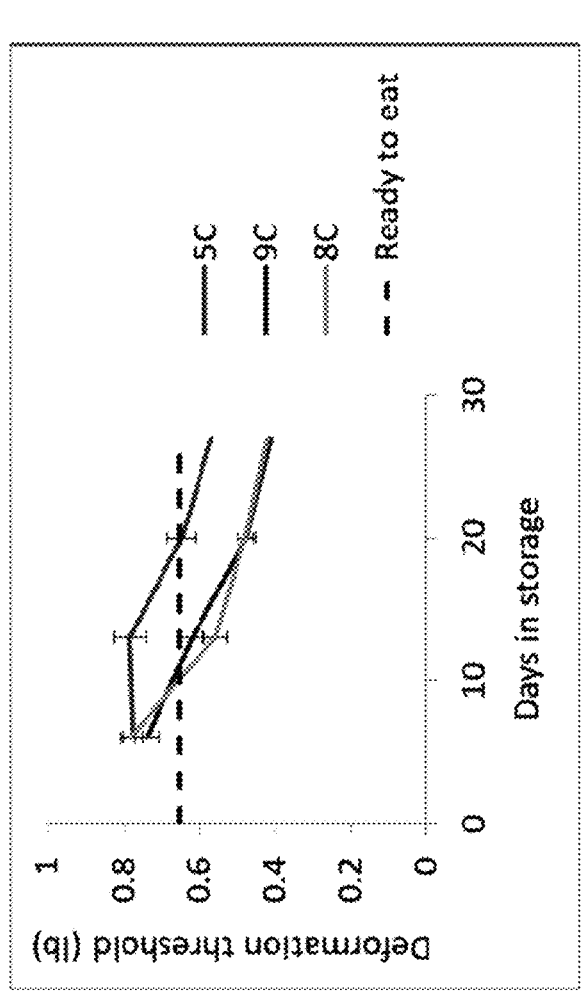
Figure 17:
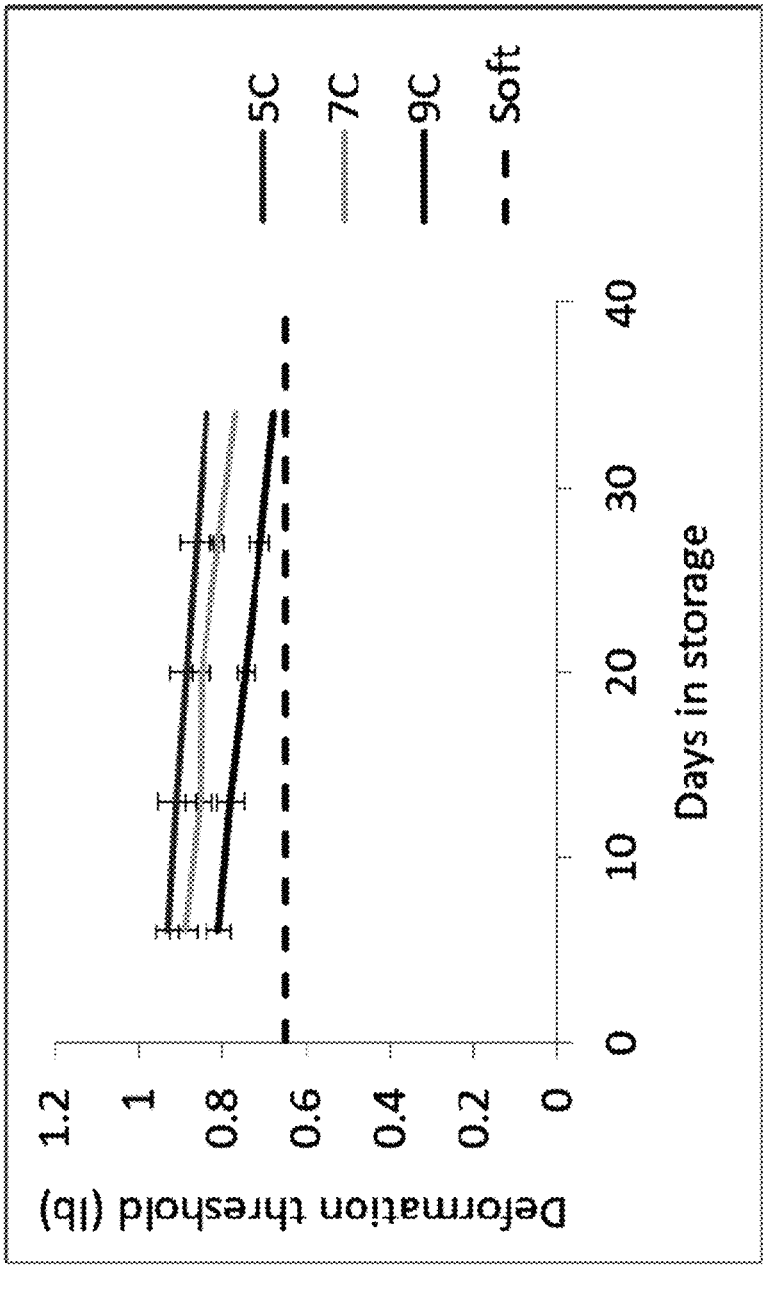
Figure 19A:
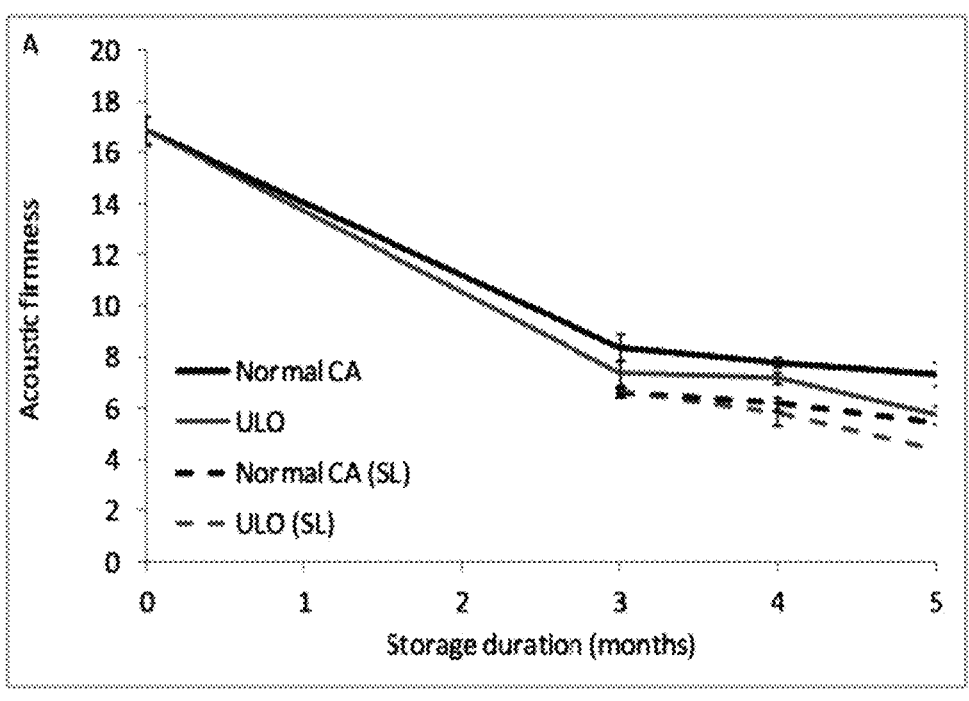
Figure 19B:
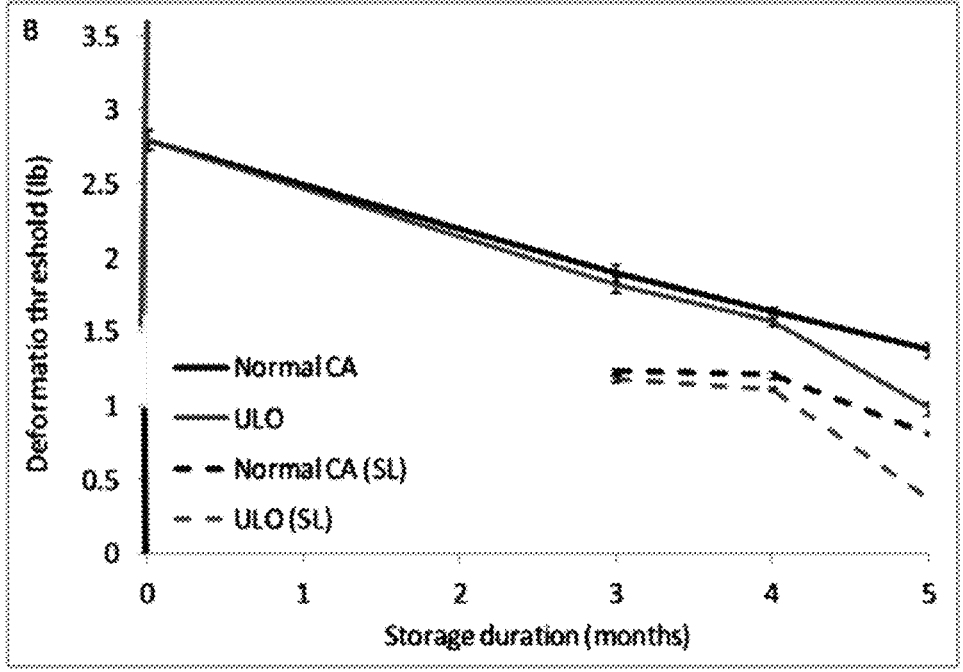
Figure 20:
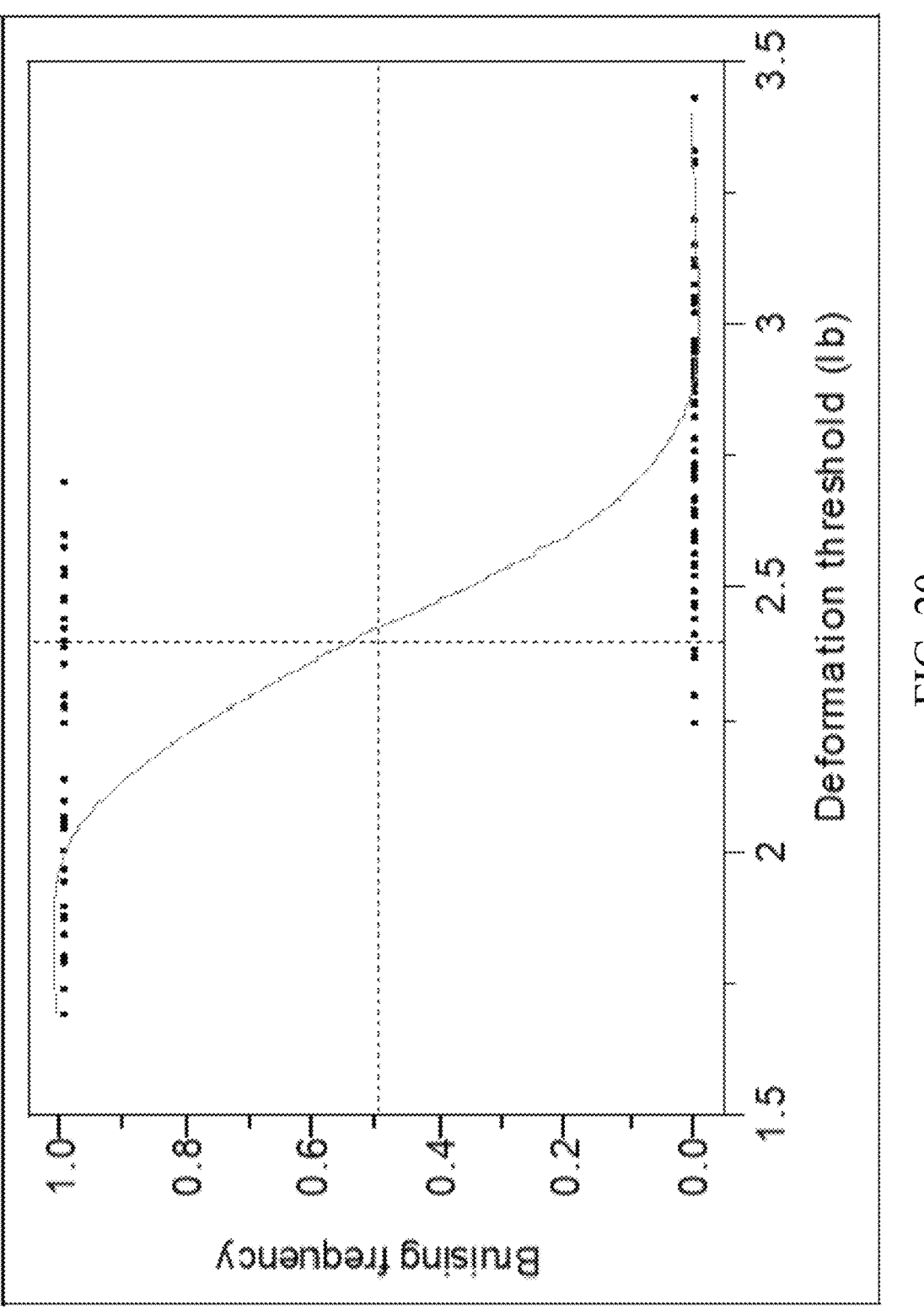

FIG. 6 shows deformation threshold (DT) of 'Heyward' kiwifruits harvested on two dates and subsequently treated or not treated with 1-MCP over 16 day storage at room temperature;

FIG. 7 shows Deformation threshold of 'Arctic pride' nectarines stored for 22 days at 5° C. under three light regimes: in the dark, in constant light and in intermittent 12 h-12 h light/dark cycles;

FIG. 8A shows deformation threshold of 'Ettinger' avocados stored for 28 days at three different temperatures;

FIG. 8B shows deformation threshold of 'Hass' avocados during shelf life at 20° C. after 21-day storage at 5° C.;

FIG. 9 shows deformation threshold of 'Shelly' mangos harvested at different dates in two different geographical regions at harvest, after exposure to 100 ppm ethylene at 30° C. for 24 hours and after 5-day storage at 20° C. (shelf life);

FIG. 10A shows the effect of storage duration of 'Triumph' persimmons on acoustic firmness;

FIG. 10B shows the effect of storage duration of 'Triumph' persimmons on deformation threshold;

FIG. 11 shows exemplary results of this procedure. 46 'Triumph' persimmons were sampled at harvest;

FIGS. 12A-12C are graphs showing firmness assessment of kiwifruits after storage in various modified atmosphere packaging (MAP) bags (9 days at 20° C. or after 21 days at 5° C.);

FIGS. 13A-13B are graphs showing the effect of storage atmospheric content of $CO_2$ (A) and $O_2$ (B) on deformation thresholds of stored kiwifruits (21 days at 5° C.). Each data point is the mean of 10 observations;

FIGS. 14A-14B are graphs showing deformation thresholds of the veil in various MAP bags containing Champignon (A) or Portobello (B) mushrooms and stored at 7° C. Measurements were made after 0, 7 and 14 (left to right columns, respectively) days in storage (n=6). Vertical lines represent standard errors. Different letters within storage duration represent significant differences between treatments;

FIG. 15 is a graph showing the deformation threshold of 'Sweetheart' cherries stored at 0° C. in different MAP bags for 21 d followed by 2 d in shelf conditions. Vertical lines represent standard errors;

FIG. 16 is a graph showing changes in the deformation threshold of 'Ettinger' avocados stored at different temperatures over 28 days;

FIG. 17 is a graph showing changes in the deformation threshold of 'Michal' citrus fruit stored at different temperatures over 34 days;

FIG. 18A-18D provide four graphs showing the effect of skin color of 'Triumph' persimmons at harvest, expressed as hue angle (top) or as a* (bottom) on acoustic firmness (left) and on deformation threshold (right). N=40;

FIGS. 19A-19B are graphs showing the effect of storage duration of 'Triumph' persimmons on acoustic firmness (A) and on deformation threshold (B). Dashed lines represent the values measured after an additional 7 days in shelf conditions. N=40. Vertical lines represent standard errors; and FIG. 20 is a graph showing a logistic model describing the effect of deformation threshold of 'Cripps pink' apples on the probability of mechanical bruising during sorting and packing in a packing facility. N=100.

DETAILED DESCRIPTION

Disclosed herein are a system and method for measuring firmness of agricultural fresh produce, such as fruits and vegetables, in a nondestructive manner. In some embodiments, the measurement may be indicative of produce ripeness and/or potential for storage.

Fast, precise quantitative evaluation of produce firmness and texture provides information indicative of maturity and ripening stage during growth and storage. Various aspects of firmness provide vital indicators for the maturity, sensitivity to physical damage during processing, and eating quality of fresh agricultural produce.

Known methods for measuring firmness include a range of laboratory instrumentation, where each variety may require a specific evaluation method: firmness of hard fruit (e.g., apples, pears) may be evaluated by penetrometry, the firmness of soft fruit (e.g., mango, avocado, kiwifruit) may be evaluated non-destructively by means of acoustic or elastic measurements, while the firmness of small fruits (e.g., cherries) may be evaluated using durometry. The instruments used to measure firmness characteristics are generally expensive. Their use requires some skill and the measured values are not readily meaningful to untrained personnel. Hence, firmness measurements have been largely restricted to service labs and large producers.

For example, currently known elastic deformation-based evaluation methods involve advancing a probe into a fruit a pre-set distance (measuring resistance) or using a pre-set force (while measuring distance). However, using such pre-sets involves a risk that the produce being measured will be damaged due to high pressure applied thereon during the measuring.

In some embodiments, the present disclosure is based on determining a deformation threshold (DT) in produce (e.g., fruits or vegetables), equal to a minimum local pressure applied to a surface of the produce that is required to cause irreversible deformation to the produce pulp. Thus, any firmness testing using a probing force applied to the produce that is below this threshold will not cause any damage (e.g., penetrate the skin and/or underlying tissue), and as such, it is considered to be a non-destructive firmness test.

In some embodiments, the present disclosure is based on findings by the present inventors that most fresh produce verities of various maturity levels exhibit a similar response curve to applied local penetrating pressure as a function of penetration depth:

Initial exponentially-increasing resistance response phase—0.2-0.3 mm, a linearly-increasing resistance response phase—0.3-3 mm, and a steady resistance response phase—3 mm and deeper, wherein a transition point between the exponential and linear phases indicates the beginning of irreversible damage to the produce via penetration.

In some embodiments, this response curve pattern is substantially similar across many produce varieties as well as produce maturity or ripeness levels, and as such allows for developing a universal approach for determining produce firmness in a nondestructive manner. In some embodiments, the decline in DT over time, as the produce ripens, is typically near-linear for many agricultural produce species and over a wide range of storage conditions. Thus, it is possible to model a DT curve for a given variety, making the evaluation of remaining storage/shelf life straightforward. The present method has a uniform response over a wide range of firmness, e.g., between 0.25 and 3.2 Kg/cm². It is thus suitable for the testing of most fruit species excluding hard agricultural produces (e.g. nuts).

Accordingly, in some embodiments, the present disclosure provides for methodology for determining a firmness index for fresh produce, based, at least in part on determining a DT in a produce item. In some embodiments, the present method may be equally suitable for determining firmness index in a large variety of fresh produce, including fruits and vegetables, and particularly in fruits such as:

Stone fruits: Fruits where the outer skin covers a soft, fleshy pulp which surrounds a single, hard stone, or pit containing a seed—e.g., cherries, apricots, nectarines, peaches, plums, avocado, olives.

Fruit with cores: Where there is a central seed-containing core surrounded by a thick layer of flesh—apples, pears, kiwis.

Large fruits without cores: Large, juicy fruits with thick skins and many seeds, e.g., melons, watermelons.

Citrus fruits: Fruits having a thick outer rind and a thin membrane which separates the flesh into segments—e.g., oranges, tangerines, grapefruits, kumquats, lemons, limes.

Starchy fruits: Pasty homogeneous starchy fruits with very soft texture that are easily mashed to pulp or follow viscous behavior when squashed, e.g., banana.

Large berries.

Tropical fruits: Papaya, figs, dates, guavas, mangoes.

Because produce firmness is related to sensory, biochemical, and physiological traits of the produce in all maturity and ripeness stages, in some embodiments, a DT in fresh produce may provide an assessment tool for the quality of the produce item at any given stage of growth or distribution stages. In some embodiments, DT may be useful for predicting optimal produce consumption time, and thus for optimizing decision making regarding harvest, storage duration, storage conditions, and supply-chain logistics.

Accordingly, in some embodiments, the present disclosure provides for methodology for determining a firmness index for fresh produce, based, at least in part on determining DT in a produce, wherein such determination may assist growers and distributors in harvest scheduling, time-to-market priorities among different produce batches, market destinations, transport and shelving conditions, and minimizing produce loss due to over-ripening.

In some embodiments, a testing system employing the present disclosure may be configured to fit a wide range of agricultural produce varying in size and pulp texture, by users such as producers, storage facilities, and retailers.

For example, a producer may benefit from the non-destructive nature of the measurement by repeatedly sampling the same fruit while intact, accurately scheduling harvest for each plot. In addition, a DT testing system, of the present disclosure can help producers address specific harvest-related problems, such as evaluating the extent of pre-harvest water stress, or as applied to some apple varieties to reduce susceptibility to mechanical bruising.

Storage facilities often face the problem of correctly evaluating the storability of different batches received from producers. Reliable indicators for storability are rather scarce in many types of produce (such as pears, cherries and avocados). Preliminary results indicate that a DT testing system of the present disclosure may be related to other produce characteristics which are difficult to describe quantitatively (such as pulp color), and thus has a potential to predict storability.

Retailers are often challenged by the problem of evaluating shelf life expectancy of fresh produce. The tools available to them are largely sensory and in most cases destructive to the produce. In contrast, a DT testing system of the present disclosure can greatly improve the ability to control produce quality, treat different batches according to their maturity status (e.g., by refrigeration), and prioritize the sale of mature batches.

In some embodiments, a deformation threshold (DT) of the present disclosure may be defined as the minimum local pressure applied to the produce surface that is required to cause irreversible deformation to the underlying tissue (e.g., fruit of vegetable pulp). As such, firmness testing based on DT may be considered non-destructive.

The firmness measurement according to the present invention is very fast, and typically lasts about 100-150 ms. This means that it may be utilized for determining remaining shelf life of fruits and vegetables even at the retail level, and/or for determining the suitable storage duration/conditions for freshly harvested produce (storage industry), and/or scheduling harvest (field level). Further applications of the method of the invention include, e.g., (1) firmness measuring of agricultural produces in a sorting line to enable classification and separation of agricultural produces according to their firmness; (2) determining remaining shelf life of fruits and vegetables and assigning suitable expiry dates (retail level); (3) determining the suitable storage duration/conditions for freshly harvested produce (storage industry); and (4) scheduling the harvest (field level).

In some embodiments, the present disclosure provides for modeling a resistive/distance curve to dynamically determine the transition distance from an elastic modulus (in which no damage to the agricultural produce occurs) to a visco-elastic modulus (which is destructive to the agricultural produce). Thus, the present disclosure provides for measuring the firmness of produce accordingly while ensuring that the testing remains non-destructive.

Figure 1:
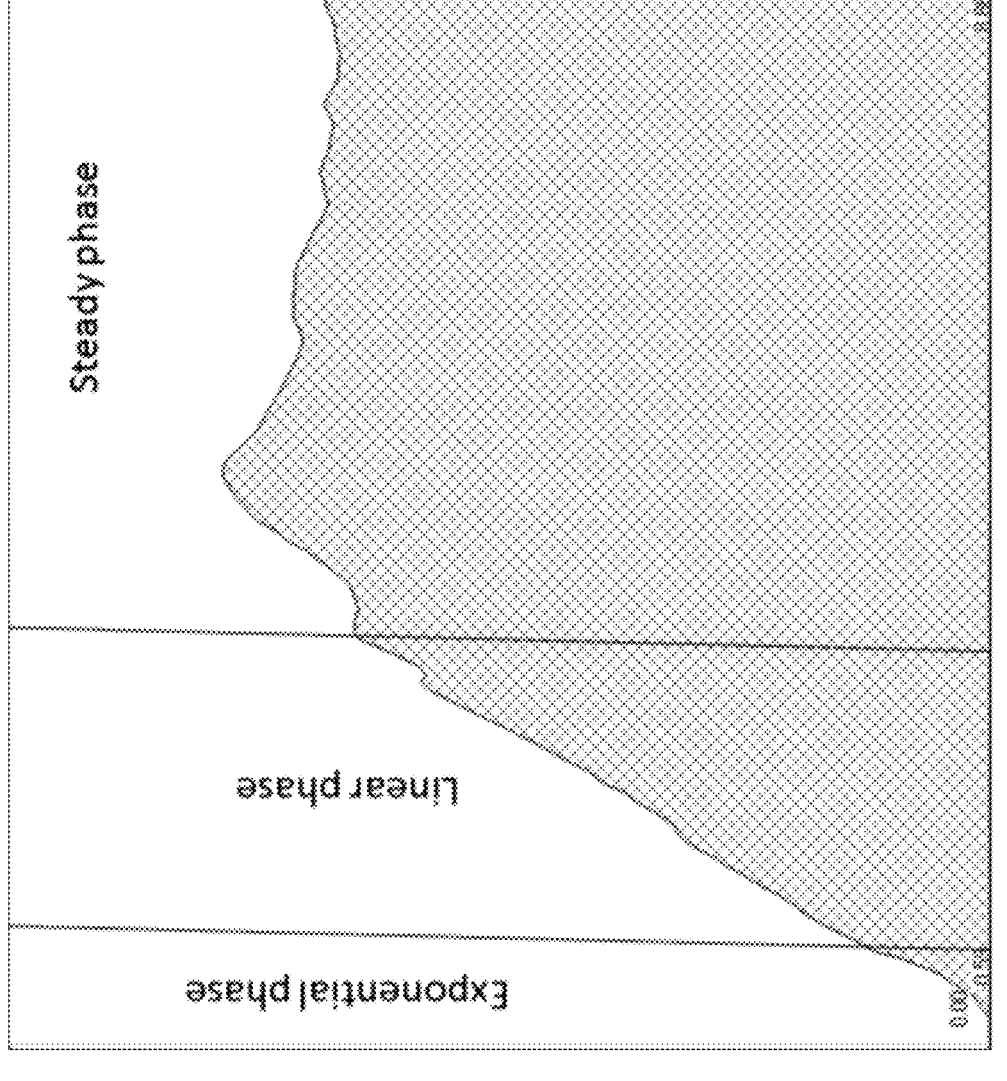
FIG. 1 is a graph illustrating the typical response phases during a penetrometric test, according to some embodiments of the present disclosure.

FIG. 1 is an exemplary resistive/distance curve which shows the initial exponentially-increasing resistance response phase, a linearly-increasing resistance response phase, and a steady resistance response phase. By detecting the point of transition between the elastic and the visco-elastic moduli and terminating the test at that point, it is ensured that the pulp tissue of the produce remains undamaged during the test, since the penetrating pressure ceases immediately before or upon entering the destructive visco-elastic modulus. As noted, this is in contrast with known firmness measuring methods, which perform the measurement based on a pre-determined parameter (either resistance or distance) and may thus damage the tested tissue and/or result in inaccurate results.

By avoiding damaging the agricultural produce during measurement, the present invention enables the possibility of testing/measuring all individual produce within a given batch, instead of sampling only a few and relying on their representativity. In addition, or alternatively, it is possible to re-test the same specific agricultural produce during different stages from harvest till marketing (because is it not damaged during any of the testing) in order to track its ripening process.

Accordingly, in certain embodiments, the method of the invention is applied to samples of agricultural produce from a batch thereof. In alternative embodiments, the method of the invention is applied to all agricultural produce within a batch. In specific embodiments, the method further includes a step of automatically sorting the agricultural produce according to their individual DT values. Such sorting may be done at any time point-either immediately after harvesting in the field, at the warehouse prior to storing and shipping, and/or at the retail shops.

Figure 2A:
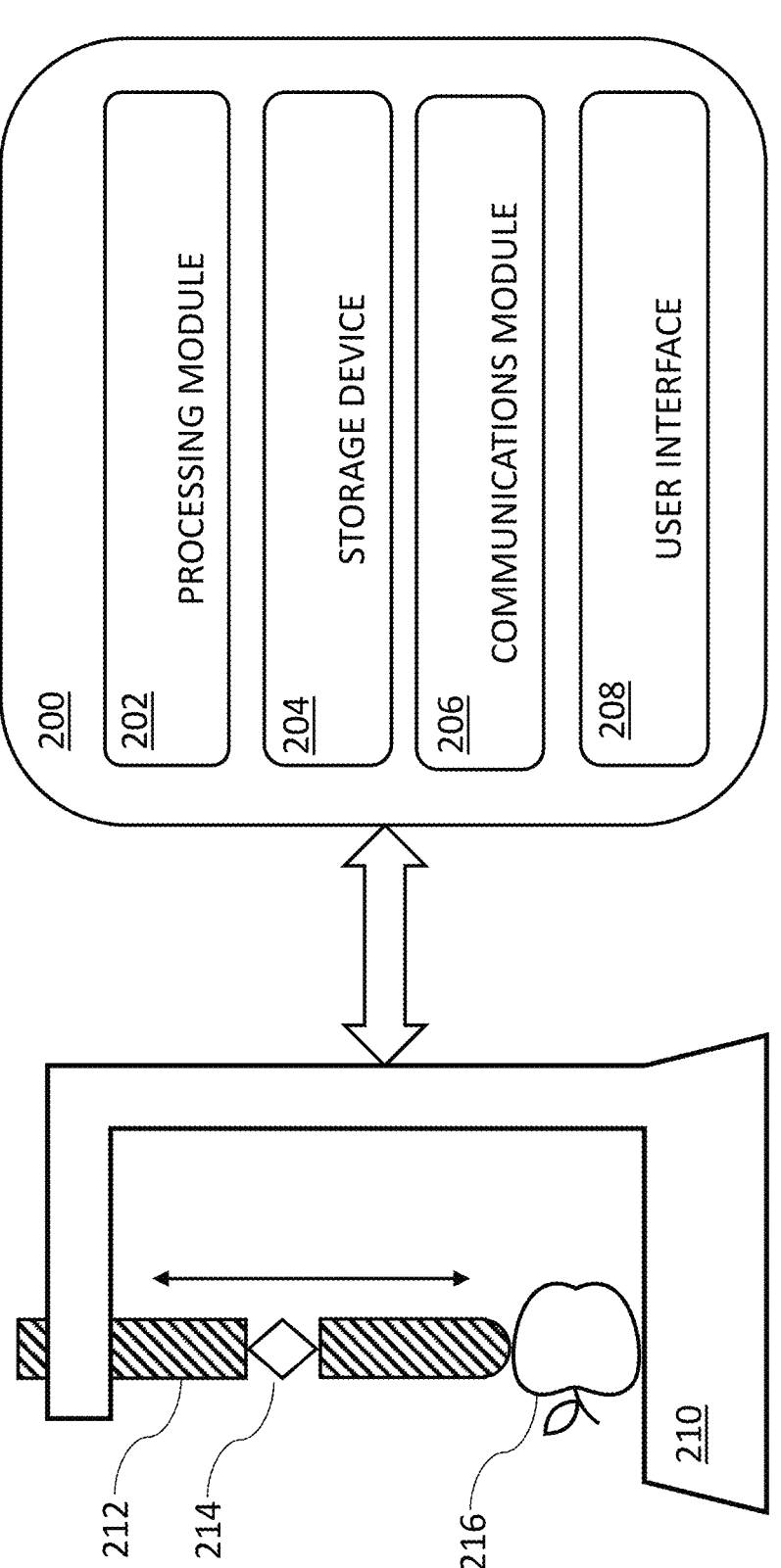
FIG. 2A is a schematic illustration of an exemplary system for measuring agricultural produce firmness and ripeness, according to some embodiments of the present disclosure.

FIG. 2A is a schematic illustration of an exemplary system 200 for measuring agricultural produce firmness and ripeness, according to some embodiments of the present disclosure.

System 200 as described herein is only an exemplary embodiment of the present invention, and in practice may have more or fewer components than shown, may combine two or more of the components, or may have a different configuration or arrangement of the components. The various components of described herein may be implemented in hardware, software or a combination of both hardware and software. In various embodiments, these systems may comprise a dedicated hardware device, or may form an addition to/or extension of an existing device.

System 200 may store in a storage device 204 software instructions or components configured to operate a processing module 202 (also "CPU," or simply "processor"). In some embodiments, the software components may include an operating system, including various software components and/or drivers for controlling and managing general system tasks (e.g., memory management, storage device control, power management, etc.) and facilitating communication between various hardware and software components.

In some embodiments, the software components of system 200 may comprise an operating system, including various software components and/or drivers for controlling and managing general system tasks (e.g., memory management, storage system control, power management, etc.) and facilitating communication between various hardware and software components.

In some embodiments, processing module 202 control and operates, e.g., a communications module 206, and/or a user interface 208.

In some embodiments, communications module 206 may be configured for connecting system 200 to a network, such as the internet, a local area network, a wide area network and/or a wireless network. In some embodiments, communications module 206 facilitates communications with other devices over one or more external ports, and also includes various software components for handling data received by system 200.

In some embodiments, user interface 208 comprises one or more of a control panel for controlling system 200, buttons, display monitor, and/or speaker for providing audio commands. In some embodiments, system 200 includes one or more user input control devices, such as a physical or virtual joystick, mouse, and/or click wheel.

In some embodiments, system 200 is configured to control and operate testing device 210 in operational communication the various modules of system 200. In some embodiments, device 210 comprises a probe 212 configured to advance and retract in relation to produce 216 positioned within a testing region of device 210. In some embodiments, system 200 is configured to advance probe 212 in specified increments and/or at a specified speed. In some embodiments, probe 212 comprises a force sensor, e.g., a strain gauge or a load cell 214 configured to measure a resisting force to the advancement of probe 212.

Figure 2B:
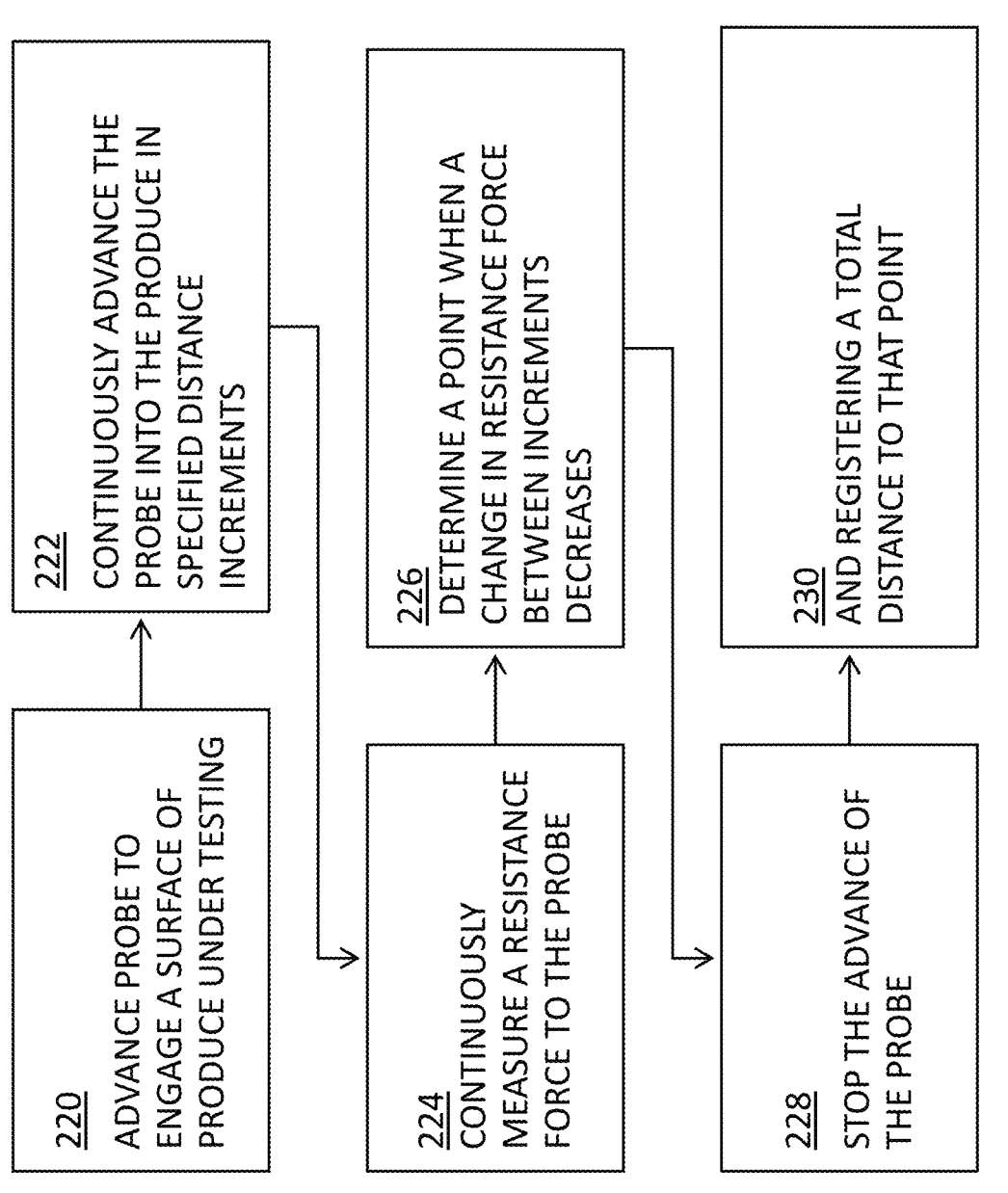

FIG. 2B is a flowchart of the functional steps in a method for measuring agricultural produce firmness and ripeness, according to some embodiments of the present disclosure.

In some embodiments, at step 220, a system of the present disclosure, e.g., system 200, is prepared for testing a produce, e.g., apple 216 in FIG. 2A.

In some embodiments, system 200 advances probe 212 to engage an external surface of apple 216.

In some embodiments, at step 222, system 200 may begin to continuously advance probe 212 into apple 216 in specified distance increments (e.g., 0.001 mm).

In some embodiments, at step 224, system, 200 continuously measures a resisting force to the advancement of probe 212 applied by the surface of the produce.

In some embodiments, at step 226, system 200 determines a point when a change in resistance force between increments decreases relative to an immediately preceding measurement (i.e., corresponding to moving from an exponential phase to a linear phase).

In some embodiments, at step 228, system 200 stops the advance of the probe at that point.

In some embodiments, at step 230, system 200 registers a number of increments (i.e., total distance) to that point.

By stopping the advance of the probe and hence the application of pressure to the produce once crossing from the exponential phase to the linear phase, undesired damage to the produce is prevented.

In some embodiments, the testing procedure is not based on any predefined threshold parameters. In some embodiments, the registered resistance force required for passing from the exponential phase to the linear phase and the total distance to that point may be converted into a final determination of a firmness value of the tested produce.

In specific embodiments of the method of the invention, the increase in distance is in intervals of, e.g., 0.001 mm. It should be noted that the selected interval is translated into the sensitivity of the measurement, such that the smaller the interval, the higher the sensitivity of the method. In further specific embodiments, the method according to the invention has a uniform response over a wide range of firmness, between 0.25 and 3.2 $Kg/cm^2$.

In alternative embodiments, a pressure sensor is driven against a tested agricultural produce, e.g. fruit, until contact therewith. Then, the sensor is pressed against the agricultural produce through a series of small steps, wherein at the end of each step the resistance voltage measured is recorded. Once a decline in resistance growth rate per distance is observed, the pressure sensor is withdrawn. The pressure sensor's position at the last step, as well as the corresponding resistance are recorded and reported.

The recorded resistance and depth data are compared to a pre-set standard matched to specific agricultural produce species/varieties in order to determine produce firmness and ripeness. In accordance with the determined ripeness, it is possible to determine, if needed, the required incubation time for bringing the agricultural produce to a ripeness state suitable for consumption (in days, weeks or months). The required incubation time may also be affected by using different storage conditions, including temperature, humidity, ethylene enrichment/absorption, atmospheric composition, etc.

Accordingly, in certain embodiments of the method according to any of the embodiments above, the determined produce firmness is indicative of its ripeness.

To apply this method according to the invention on a variety of agricultural produces, the deformation threshold (DT) for each type of agricultural produce should be predetermined. Further, the rate of change of deformation threshold under different conditions (e.g., temperature) should be characterized in order to provide optimum calculation of incubation time. Based on these measurements the firmness, ripeness and shelf life of the agricultural produce can be determined.

Accordingly, in certain embodiments, the method according to any of the embodiments above is carried out: (i) at the field, prior to the harvesting of each agricultural produce; or (ii) after harvesting, e.g., at the field or in the warehouse. In specific embodiments, the measurement of produce firmness is carried out after harvesting and the method further comprises a step of sorting the harvested agricultural produces according to their firmness/ripeness.

In certain embodiments of the method according to any of the embodiments above, the measurement of produce firmness is carried out periodically on random samples of agricultural produce batches during storage, e.g., in order to know which agricultural produce batches are riper so that they are sent out to the market/shelves before others.

Unless otherwise indicated, all numbers, e.g., numbers expressing periods of time or ranges, used in this specification are to be understood as being modified in all instances by the term "about." Accordingly, unless indicated to the contrary, the numerical parameters set forth in this specification are approximations that may vary by up to plus or minus 10% depending upon the desired properties to be obtained by the present invention.

Experimental Results

Apples

Figures 3A, 3B:
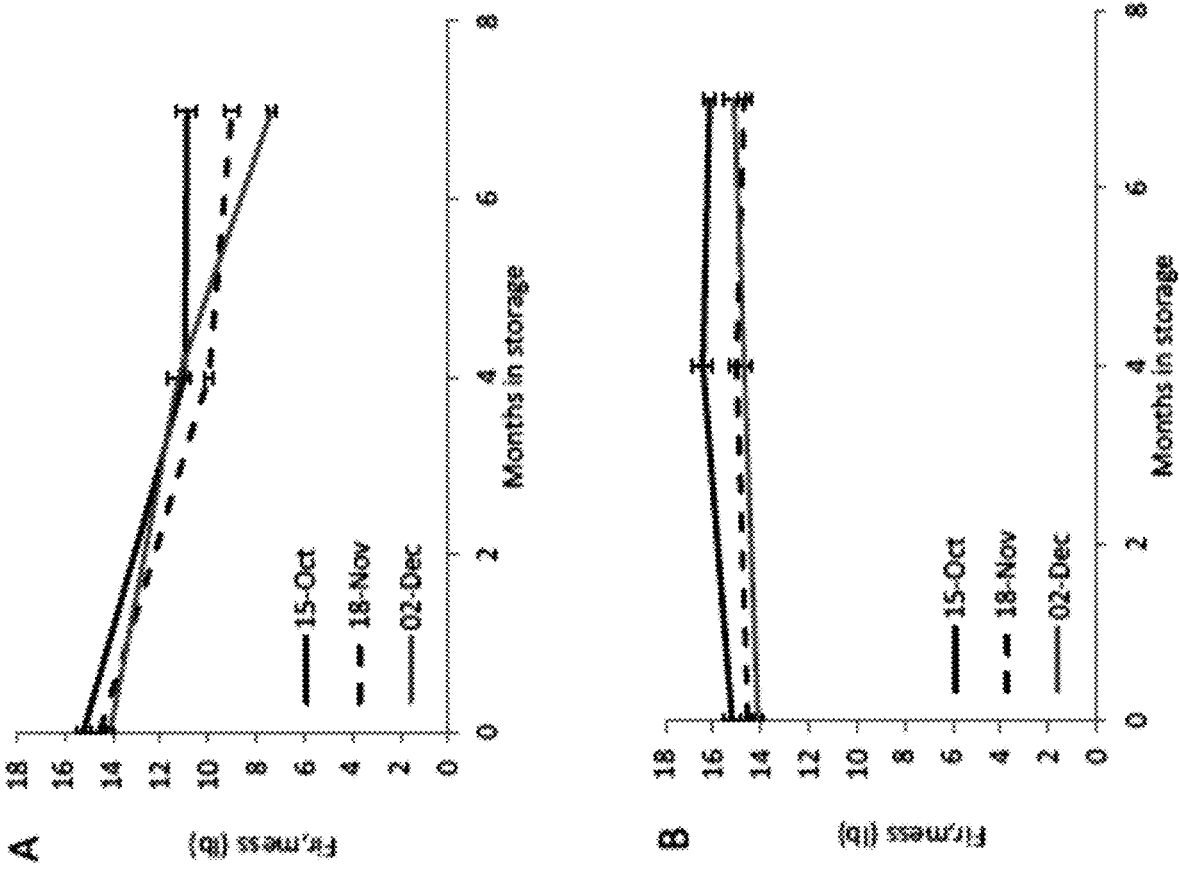
Figures 3C, 3D:
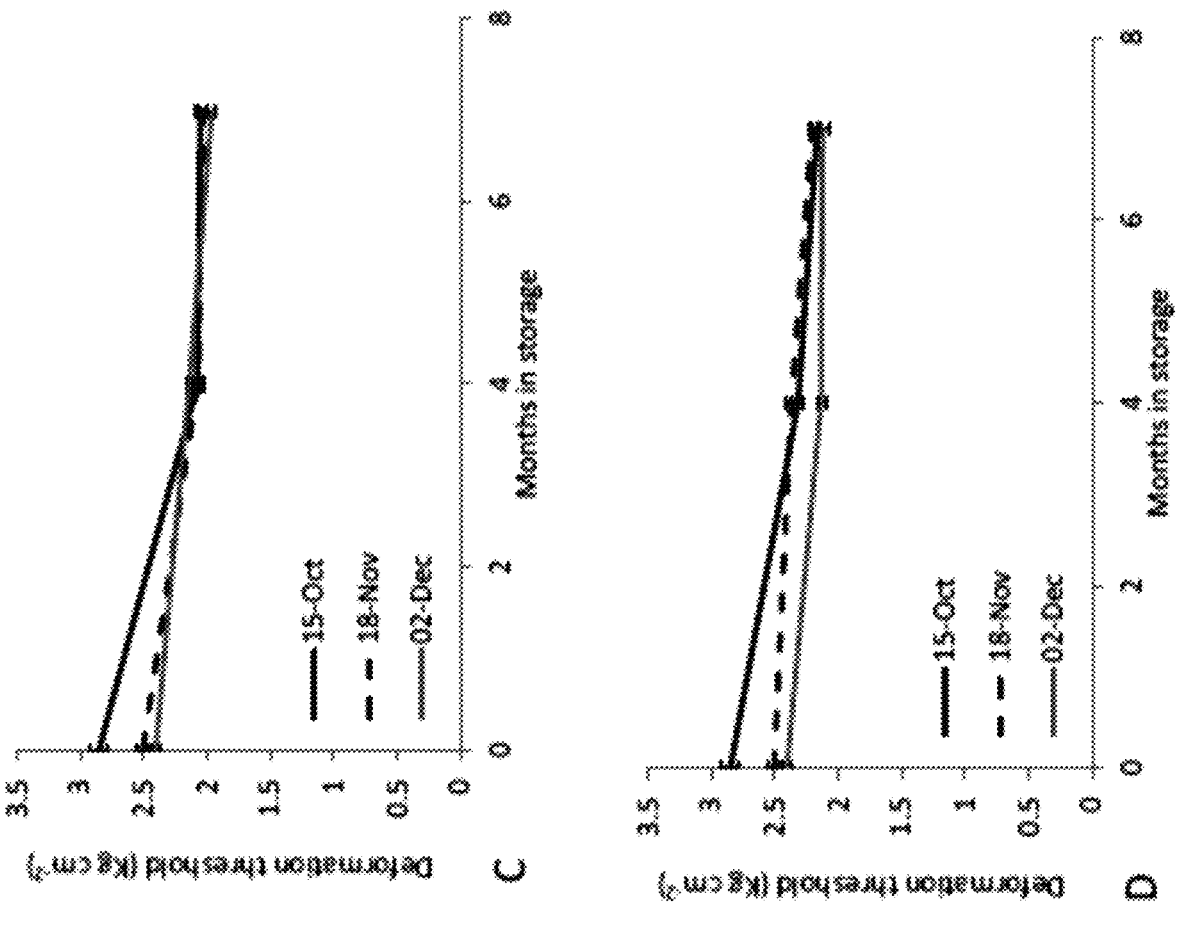

Apples are typically stored after harvest at 0-1° C. for durations ranging between 3-12 months. During storage, the fruit undergoes a slow maturation process: it softens, becomes sweeter as starch is degraded into soluble carbohydrates and organic acid content decreases, and becomes more susceptible to biotic and abiotic stress. The maturation process is accompanied by a gradual increase in respiration, which is internally controlled by autocatalytic ethylene emission. To limit the effect of ethylene metabolism, a competitive ethylene inhibitor—1-methylcyclopropene (1-MCP) is often applied to freshly-harvested apples. Exposure to 1-MCP typically blocks the softening process, allowing for the fruit to remain firm and crisp even after long storage durations (FIG. 3). FDT, however, does not respond to 1-MCP application in the same manner and undergoes decline. FIGS. 3A-3D show changes in penetrometric firmness (3A-3B) and in deformation threshold (3C-3D) of Granny Smith apples harvested on various dates. 1-MCP-treated apples (3B, 3D) are compared to non-treated ones (3A, 3C).

In a detailed study comparing apples of four varieties grown in various global regions, objective quality traits were compared to subjective flavor evaluation made by a skilled panel. As may be expected, sweetness perception was tightly related to total soluble solids (TSS) which closely matches sugar content, tartness was related to acid content, and perceived firmness was related to measured penetrometric firmness.

Deformation threshold (DT) was related to sensory attributes which are difficult to measure instrumentally, such as crispness, juiciness and unwanted off-flavor (Table 1). Moreover, a stepwise analysis revealed that the combination of TSS and deformation threshold alone can predict the overall sensory satisfaction from an apple. Table 2 details a linear model describing the combined effects of total soluble solids (TSS) and deformation threshold on the perceived "total flavor satisfaction" of apples (N=28). FIG. 4 shows the performance of a linear model predicting the perceived "total flavor satisfaction" from TSS and deformation threshold for different apple varieties (N=28).

10

TABLE 1

| | Sweet-ness | Tart-ness | Crispness | Juiciness | Off-flavors | Total Flavor |
|---|---|---|---|---|---|---|
| Deformation Threshold | | | +++ | ++ | + | ++ |
| Firmness | | | +++ | | | |
| TSS | +++ | | − | | | +−+ |
| Malic acid | | +++ | | | | |
| ph | | | | | + | |

TABLE 2

| Term | Estimated | Std. Error | t Ratio | Prbo > \|t\| |
|---|---|---|---|---|
| Intercept | −4.07 | 2.482 | −1.64 | 0.1186 |
| DT (lb) | 1.72 | .644 | 2.66 | 0.0158 |
| TSS | 0.41 | 0.159 | 2.6 | 0.018 |

Kiwifruit

The softening of kiwifruits is closely related to a decline in deformation threshold. This decline is prevalent during cold storage as well as during shelf life. FIG. 5 shows deformation threshold of 'Heyward' kiwifruits harvested on two dates and subsequently treated or not treated with 1-MCP. Column from left to right indicate storage duration: 6 months, 8 months, and 10 months. N=40 for each observation. The letters mark statistically significant differences between treatments.

The near-linear decline during storage in room conditions enables a sound prediction of the remaining shelf life of the fruit at any given moment. FIG. 6 shows deformation threshold (DT) of 'Heyward' kiwifruits harvested on two dates and subsequently treated or not treated with 1-MCP over 16 day storage at room temperature. The line at 0.8 depicts the border between "too hard" and "ready to eat" conditions. N=40 for each observation. The letters mark statistically significant differences between treatments.

Nectarines

Similar to kiwifruit, the perceived softening of nectarines (and other stone fruits) is closely related to a decline in deformation threshold. 'Arctic pride' nectarines were stored at 5° C. at various light exposure regimes and their deformation threshold was tracked over a 3-week period, during which the fruit retained satisfactory firmness despite a slow softening. FIG. 7 shows Deformation threshold of 'Arctic pride' nectarines stored for 22 days at 5° C. under three light regimes: in the dark, in constant light and in intermittent 12 h-12 h light/dark cycles. The horizontal line depicts the transition between "ready to eat" and "too soft" conditions. N=12 for each observation.

Avocado

Avocados are typically harvested when hard, allowing for long storage before they reach a ready-to-eat condition. Storage conditions, and specifically storage temperature have a prominent effect on the rate of softening and hence on the shelf life of the fruit. FIG. 8A shows deformation threshold of 'Ettinger' avocados stored for 28 days at three different temperatures. The horizontal black line depicts the transition between "too hard" and "ready to eat" conditions. N=10 for each observation.

Deformation threshold measurements can indicate the maturity of the fruit even when too hard to be perceived by hand. FIG. 8B shows deformation threshold of 'Hass' avocados during shelf life at 20° C. after 21-day storage at 5° C. Different column depict different orchards in the western Galilee region of Israel. The horizontal depicts the transition between "too hard" and "ready to eat" conditions. N=25 for each observation.

Mango

In Israel, mango fruits are typically harvested when un-ripe in order to meet the high prices offered in the local market at the beginning of the season (June-July). To ripen such fruit, it is common to expose it to ethylene in a warm chamber. Ethylene exposure promotes changes to skin and pulp color and to the firmness of the fruit. However, extending the exposure beyond the necessary duration might cause over-ripeness, shorten the fruit's potential shelf life and thus degrade its commercial value. Deformation threshold is a possible tool for tracking the softening of the fruit during exposure to ethylene, ensuring the treatment is terminated on time. It can also indicate the length of remaining shelf life after treatment.

FIG. 9 shows deformation threshold of 'Shelly' mangos harvested at different dates in two different geographical regions at harvest, after exposure to 100 ppm ethylene at 30° C. for 24 hours and after 5-day storage at 20° C. (shelf life). The horizontal line depicts the transition between "too hard" and "ready to eat" conditions. N=20 for each observation. The letters represent significant differences between treatments.

Persimmon

One of the main limiting factors of persimmon storage is softening. After 4-6 months in cold storage, the fruit becomes too soft to command acceptable prices in the market. Deformation threshold declines at a near-linear rate during persimmon storage, allowing for reliable evaluation of the fruit's storability. In this respect, deformation threshold is a better indicator than acoustic firmness, which is the current standard for non-destructive firmness evaluation for this species.

FIG. 10A shows the effect of storage duration of 'Triumph' persimmons on acoustic firmness, and 10B on deformation threshold (B). Dashed lines represent the values measured after an additional 7 days at shelf conditions.

Persimmon Classification

In order to link measured deformation thresholds to sensory firmness, a trained technician was asked to evaluate and describe the condition of individual fruits. Deformation threshold was measured on two sides of each classified fruit and the average of the resulting values was used to determine the thresholds of each class. FIG. 11 shows exemplary results of this procedure. 46 'Triumph' persimmons were sampled at harvest. Half of the fruits were exposed to 1-MCP (0.6 ppm for 24 hours) in order to increase firmness variability (left). The fruits were then stored for five months at −1° C. and for an additional 7 days at 20° C. The fruits were then divided by a skilled technician into four sensory firmness classes. The range of deformation threshold matching each of the classes was subsequently obtained (right).

Additional Experimental Results

Kiwi

Kiwi firmness of fruits stored in different modified atmosphere packaging (MAP) bags was assessed using the known Pulp deformation threshold technique which is a non-destructive method (FIG. 12B). The results were compared to measurements obtained from the same fruits using the Elastic firmness technique, in which a reaction of fruit impact is measured (FIG. 12A), and to the Core deformation threshold in which the measurements are performed directly on the core of the fruit (FIG. 12C).

A correlation between firmness assessed by utilizing the three methods was found. Notably, by comparing the third and fourth columns in the different graphs, pulp deformation threshold demonstrated higher sensitivity to differences in firmness than the elastic firmness method.

Linear Correlation Between Deformation Threshold and $CO_2$ Concentration

Deformation threshold of Kiwifruits that were packed in MAP bags was measured as explained above. Typically, a MAP bag is designed to keep the packaged fruit fresh by allowing limited penetration of gases, which leads in time to an elevation in the $CO_2$ concentration and a decrease in $O_2$ concentration inside the MAP bag. As a result, respiration and softening of the packed fruit are slowed down. A low concentration of $CO_2$ led to low firmness whereas high concentrations resulted in high firmness.

The results, as show in FIGS. 13A and 13B, demonstrate a linear correlation between measured pulp deformation threshold and $CO_2$ and $O_2$ concentration.

Deformation Threshold May be Utilized for a Variety of Agricultural Produces

Mushrooms: Deformation threshold of two types of mushrooms was measured during storage in MAP bags. The results are demonstrated in FIGS. 14A and 14B, which show a decrease in deformation threshold during storage in MAP bags.

Cherries: Storing cherries in different MAP bags did not influence their measured deformation threshold. However, a decrease in cherries' firmness was observed due to exposure to high temperature during storage (FIG. 15).

Avocados: storing 'Ettinger' avocados at different temperatures for a time period of 28 days showed a decrease in the deformation threshold during storage (FIG. 16), indicating that they reach ripeness after about 10 days of storage at 8-9° C. However, reducing storage temperature to 5° C. slowed the ripening process and the stored fruit reached ripeness after about 20 days.

Citrus: storing 'Michal' citrus at different temperatures for a time period of 34 days showed a decrease in the deformation threshold during storage (FIG. 17). Deformation threshold decline rate was positively affected by storage temperature in the range between 5-9° C. However, due to the good storability of this agricultural produce, the fruit remained suitable for consumption throughout the entire storage period at all storage temperatures.

Skin Color as an Indication of Ripeness

Skin color is used as a rough indicator of fruit maturity during harvest, and is related to fruit firmness.

Figure 18A:
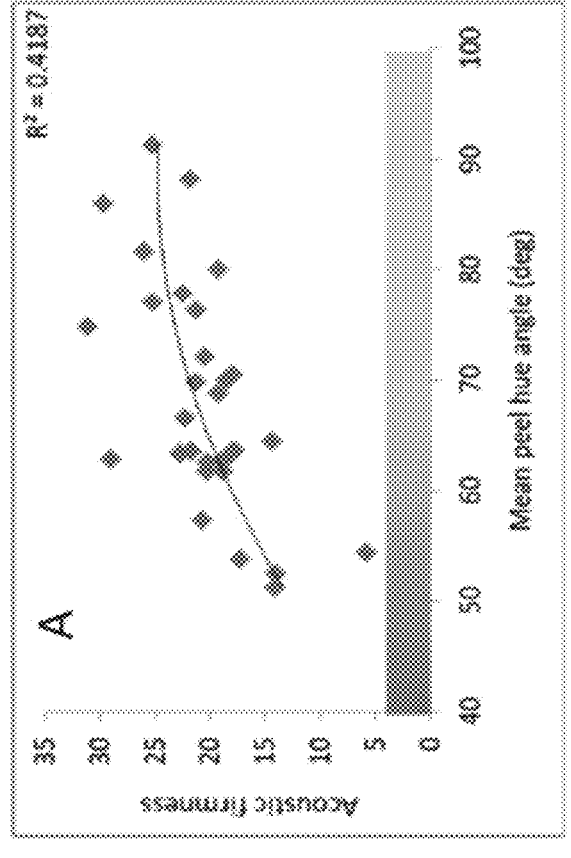
Figure 18B:
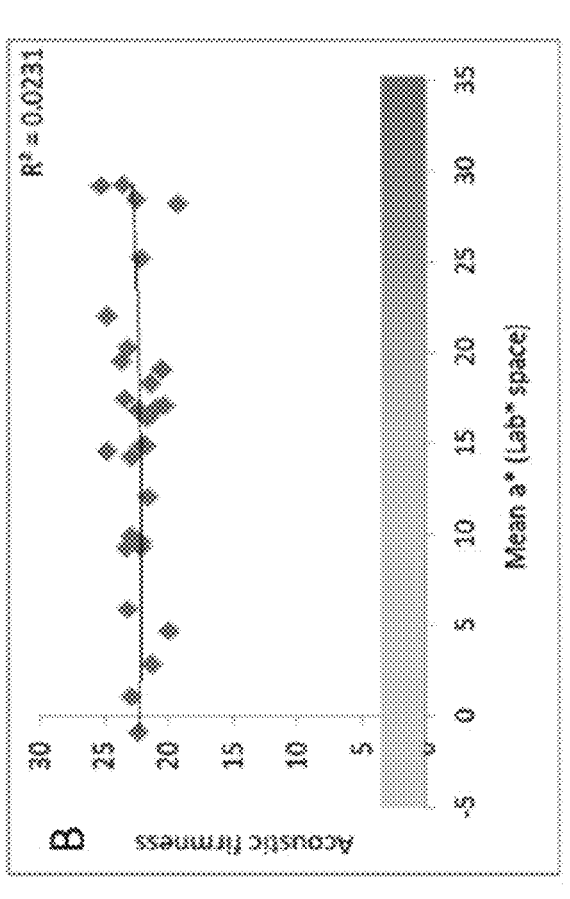
Figure 18C:
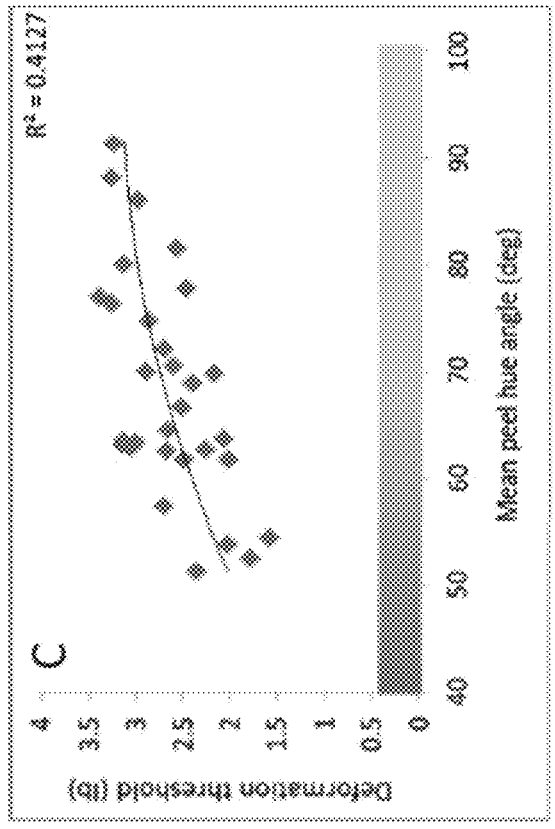
Figure 18D:
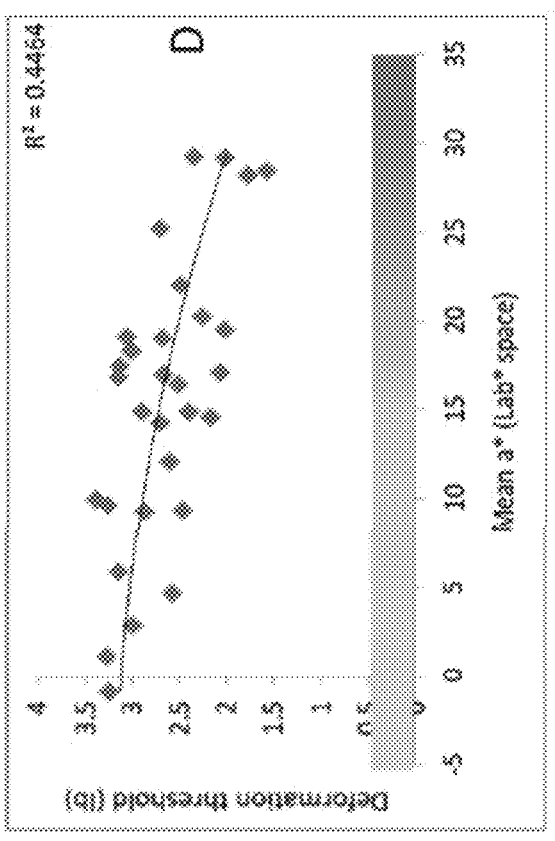

Accordingly, the color of 'Triumph' persimmons was measured at the time of harvest and their deformation threshold (FIGS. 18C and 18D) was measured and compared to measurement with the acoustic firmness technique (FIGS. 18A and 18B). Both measures related to the skin hue angle to a similar degree. However, deformation threshold also correlated with the skin's a channel value (green to red axis-light grey to dark grey in the figures), while acoustic firmness did not.

Following the above, the persimmons were examined in order to evaluate the effect of prolonged storage on their deformation threshold (FIG. 19B) compared to the acoustic firmness technique (FIG. 19A) under two storage regimes: 1.5% oxygen (normal CA) and 0.7% oxygen (ULO). Full lines represent values immediately after storage while dashed lines represent values following an additional 7 days at shelf conditions. Those figures demonstrate: (a) a higher sensitivity of deformation threshold compared to acoustic firmness for soft fruit; and (b) the near-linear decline in deformation threshold over storage time.

Deformation Threshold and Probability of Mechanical Bruising During Sorting & Packing FIG. 20 is a graph showing a logistic model describing the effect of deformation threshold of 'Cripps pink' apples on the probability of mechanical bruising during sorting and packing in a packing facility. 50 newly-bruised apples and 50 non-bruised apples were collected from a commercial sorting line after 6 months storage. Deformation threshold was measured in each fruit and the values were used to compute the probability for bruising depending on deformation threshold. P=0.004.

What is claimed is:

1. A system comprising:
a testing device comprising:
    a probe configured to be advanced to engage a produce item positioned in relation to said testing device;
    at least one sensor configured to measure a resisting force by said produce item as a function of an advancement distance;
at least one hardware processor; and
a non-transitory computer-readable storage medium having stored thereon program instructions, the program instructions executable by the at least one hardware processor to:
    a. operate said testing device to advance said probe to engage a surface of said produce item while measuring said resisting force,
    b. detect a first exponentially-increasing resistance response phase of the resisting force occurring between 0.2-0.3 mm of the advancement distance,
    c. detect a second linearly-increasing resistance response phase occurring between 0.3-3 mm of the advancement distance,
    d. determine a transition point between the exponentially-increasing resistance response phase and the linearly-increasing resistance response phase by monitoring for a decrease in resistance force change between increments of the advancement distance,
    e. discontinue said advancing and retrieve the probe when said transition point is detected, and
    f. determine a transition resisting force and a transition distance at said transition point, wherein said transition point indicates a beginning of irreversible damage to the produce item.

2. The system of claim 1, wherein said produce item is one of a fruit and a vegetable.

3. The system of claim 1, wherein at least one of the transition resisting force and the transition distance is indicative of a ripeness parameter of said produce item.

4. The system of claim 1, wherein said hardware processor is configured to iterate, steps a to f, with respect to a produce item of a specified variety, at two or more known ripeness stages of said produce item.

5. The system of claim 4, wherein said transition resisting force and said transition distance are stored as firmness values indicative of a ripeness parameter of said specified variety at said two or more ripeness stages.

6. The system of claim 1, wherein said advancing is performed in increments of a specified distance.

7. The system of claim 6, wherein said specified distance is between 0.001 and 0.1 mm.

8. A method for measuring firmness of a soft fruit, the method comprising:
    a. providing a testing device comprising:
        a probe configured to be advanced to engage a soft fruit positioned in relation to said testing device, wherein said soft fruit is characterized by having a soft texture that is easily mashed to pulp or follow viscous behavior when squashed, and
        at least one sensor configured to measure a resisting force by said soft fruit as a function of an advancement distance;
    b. operating said testing device to advance said probe to engage a surface of said soft fruit while measuring said resisting force;
    c. detecting a first exponentially-increasing resistance response phase of the resisting force occurring between 0.2-0.3 mm of the advancement distance,
    d. detecting a second linearly-increasing resistance response phase occurring between 0.3-3 mm of the advancement distance,
    e. determining a transition point between the exponentially-increasing resistance response phase and the linearly-increasing resistance response phase by monitoring for a decrease in resistance force change between increments of the advancement distance,
    f. discontinuing said advancing, and retrieve the probe when said transition point is detected; and
    g. determining for the transition point, a transition resisting force and a transition distance at said transition point, wherein said transition point indicates a beginning of irreversible damage to the soft fruit.

9. The method of claim 8, wherein said produce item is one of a fruit and a vegetable.

10. The method of claim 8, wherein at least one of said transition resisting force and said transition distance is indicative of a ripeness parameter of said produce item.

11. The method of claim 8, wherein said operating, discontinuing, and determining are iterated, with respect to a produce item of a specified variety, at two or more known ripeness stages of said produce item.

12. The method of claim 11, wherein said transition resisting force and said transition distance are stored as firmness values indicative of a ripeness parameter of said specified variety at said to or more ripeness stages.

13. The method of claim 8, wherein said advancing is performed in increments of a specified distance.

14. The method of claim 13, wherein said specified distance is between 0.001 and 0.1 mm.

* * * * *